United States Patent
Otake

(10) Patent No.: US 9,969,405 B2
(45) Date of Patent: May 15, 2018

(54) ALARM APPARATUS, ALARM SYSTEM, ALARM METHOD AND PORTABLE TERMINAL

(71) Applicant: TOYOTA JIDOSHA KABUSHIKI KAISHA, Toyota-shi, Aichi-ken (JP)

(72) Inventor: Hirotada Otake, Susono (JP)

(73) Assignee: TOYOTA JIDOSHA KABUSHIKI KAISHA, Toyota-Shi, Aichi-ken (JP)

(*) Notice: Subject to any disclaimer, the term of this patent is extended or adjusted under 35 U.S.C. 154(b) by 0 days. days.

(21) Appl. No.: 14/926,828

(22) Filed: Oct. 29, 2015

(65) Prior Publication Data
US 2016/0121907 A1 May 5, 2016

(30) Foreign Application Priority Data

Oct. 30, 2014 (JP) ................................ 2014-221476

(51) Int. Cl.
| | |
|---|---|
| *G01C 22/00* | (2006.01) |
| *B60W 50/14* | (2012.01) |
| *G05D 1/00* | (2006.01) |
| *B60W 10/20* | (2006.01) |

(Continued)

(52) U.S. Cl.
CPC ............. *B60W 50/14* (2013.01); *B60W 10/04* (2013.01); *B60W 10/18* (2013.01); *B60W 10/20* (2013.01);
(Continued)

(58) Field of Classification Search
CPC ...... B60W 50/14; B60W 10/04; B60W 10/18; B60W 10/20; B60W 40/04;
(Continued)

(56) References Cited

U.S. PATENT DOCUMENTS 5,774,069 A    6/1998 Tanaka et al.
6,038,502 A *  3/2000 Sudo ..................... G01S 13/931
                                                          180/167

(Continued)

FOREIGN PATENT DOCUMENTS

CN          104093619 A      10/2014
DE   10 2007 049 603 A1      7/2008
(Continued)

OTHER PUBLICATIONS

Lapoehn et al., "Concept of controlling the usage of nomadic devices in highly automated vehicles", IET Intelligent Transport Systems, 2015, vol. 9, No. 6, pp. 599-605.

*Primary Examiner* — Shardul D Patel
(74) *Attorney, Agent, or Firm* — Sughrue Mion, PLLC

(57) ABSTRACT

An alarm apparatus for a vehicle is configure to be capable of communicating with a portable terminal to be used at a driver seat by a driver of the vehicle that performs automatic driving, alarms the driver using the portable terminal, and includes a determination unit that determines whether a distance or arrival time from the vehicle to a termination position for the automatic driving is a predetermined value or less, during the automatic driving, based on position information about the vehicle and map information, or based on surrounding environment information about the vehicle, and an alarm unit that displays alarm information for having the driver start manual driving, on a screen of the portable terminal, when the determination unit determines that the distance or arrival time from the vehicle to the termination position for the automatic driving is the predetermined value or less.

16 Claims, 12 Drawing Sheets

(51) Int. Cl.
  *B60W 10/18* (2012.01)
  *B60W 10/04* (2006.01)
  *B60W 40/04* (2006.01)
  *G01C 21/26* (2006.01)
  *B60W 50/00* (2006.01)
  *G01C 21/36* (2006.01)

(52) U.S. Cl.
  CPC ........... *B60W 40/04* (2013.01); *G05D 1/0061* (2013.01); *B60W 2050/0002* (2013.01); *B60W 2050/143* (2013.01); *B60W 2050/146* (2013.01); *G01C 21/26* (2013.01); *G01C 21/3629* (2013.01); *G05D 2201/0213* (2013.01)

(58) Field of Classification Search
  CPC ... B60W 2050/0002; B60W 2050/143; B60W 2050/146; G05D 1/0061; G05D 2201/0213; G01C 21/26; G01C 21/3629
  USPC .......................................................... 701/23
  See application file for complete search history.

(56) References Cited

U.S. PATENT DOCUMENTS

| | | | | |
|---|---|---|---|---|
| 8,670,891 | B1* | 3/2014 | Szybalski | B62D 1/286 701/23 |
| 2008/0097700 | A1* | 4/2008 | Grimm | G08G 1/168 701/301 |
| 2012/0212353 | A1* | 8/2012 | Fung | B60K 28/06 340/905 |
| 2015/0015386 | A1* | 1/2015 | Langenhan | B60W 50/14 340/438 |
| 2015/0158469 | A1* | 6/2015 | Cheatham, III | B60T 7/12 701/96 |
| 2015/0274158 | A1* | 10/2015 | Fujita | B60W 30/00 701/23 |
| 2015/0309717 | A1* | 10/2015 | Sinaguinan | G06F 3/04847 701/538 |
| 2015/0371527 | A1* | 12/2015 | Kleen | B62D 1/00 340/457 |
| 2016/0214483 | A1* | 7/2016 | Kleen | B60W 50/14 |
| 2016/0280234 | A1* | 9/2016 | Reilhac | B60K 35/00 |

FOREIGN PATENT DOCUMENTS

| | | |
|---|---|---|
| JP | 9-86223 A | 3/1997 |
| JP | 9-161196 A | 6/1997 |
| JP | H11219130 A | 8/1999 |
| JP | 2005016986 A | 1/2005 |
| JP | 2005-148815 A | 6/2005 |
| JP | 2006-284454 A | 10/2006 |
| JP | 2008-143381 A | 6/2008 |
| WO | 2014124936 A2 | 8/2014 |

* cited by examiner

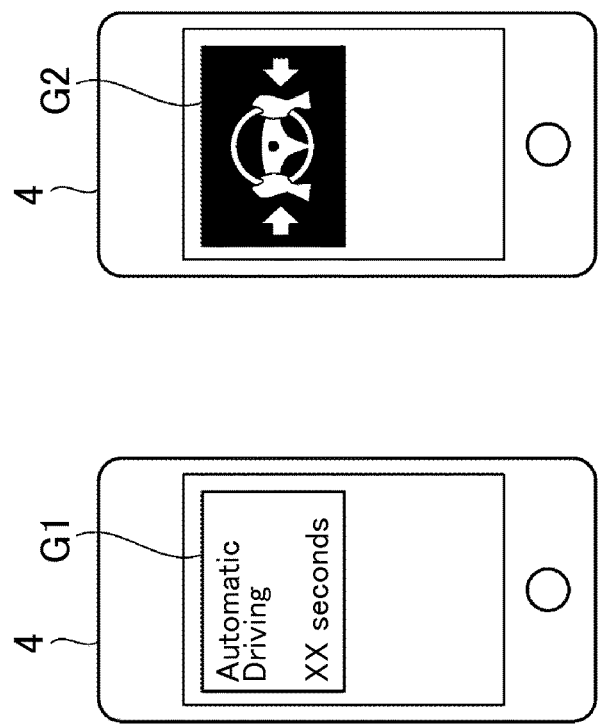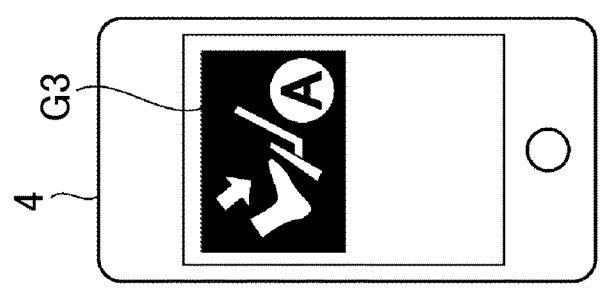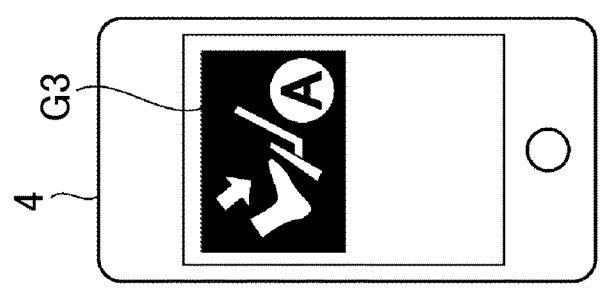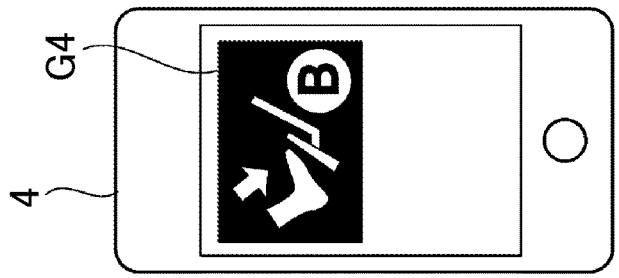

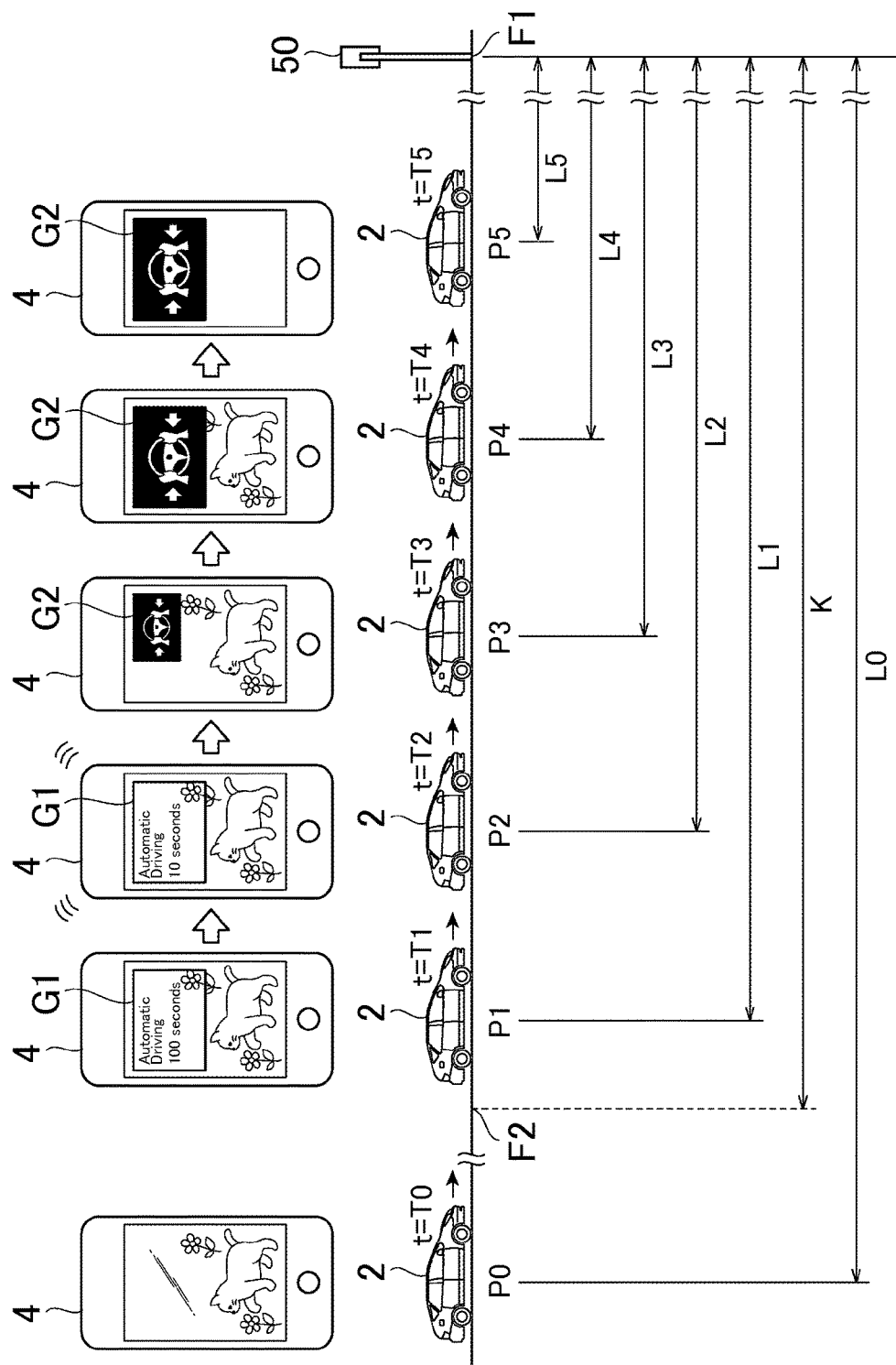

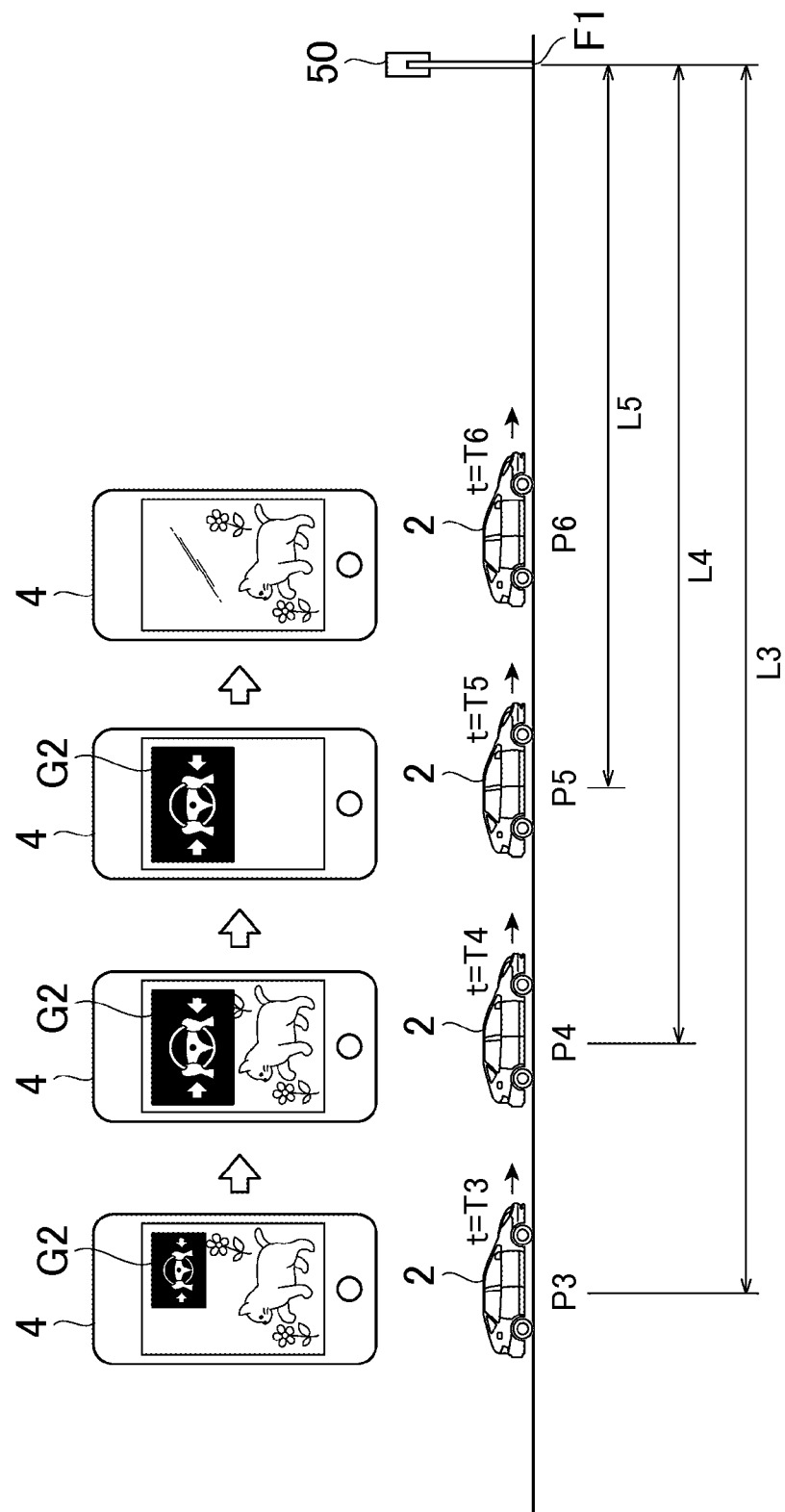

ALARM APPARATUS, ALARM SYSTEM, ALARM METHOD AND PORTABLE TERMINAL

INCORPORATION BY REFERENCE

The disclosure of Japanese Patent Application No. 2014-221476 filed on Oct. 30, 2014 including the specification, drawings and abstract is incorporated herein by reference in its entirety.

BACKGROUND OF THE INVENTION

1. Field of the Invention

The invention relates to an alarm apparatus, an alarm system, an alarm method, and a portable terminal.

2. Description of Related Art

In U.S. Pat. No. 8,670,891, there is described a vehicle that can switch between manual driving by a driver and automatic driving by an in-vehicle computer. The vehicle, in the automatic driving, switches from the automatic driving to the manual driving, based on a detection result of a touch sensor provided on a steering. Furthermore, the vehicle displays the control state of the automatic driving of the vehicle, on a display of a dashboard.

By the way, in a vehicle that performs the automatic driving, as exemplified by the vehicle described in U.S. Pat. No. 8,670,891, a situation in which the automatic driving cannot be continued occurs in some cases. For example, in the case where the information necessary for the automatic driving cannot be acquired (for example, the case where a white line in front of the vehicle cannot be recognized), or in the case where the vehicle during the automatic driving for an expressway is close to an exit of the expressway, it is necessary to terminate the continuing automatic driving and to switch to the manual driving. However, the driver sometimes focuses attention on a portable terminal during the automatic driving, and there is a fear that it is impossible to prompt the driver to perform the manual driving, even if the alarm information for the start of the manual driving is displayed on the display of the dashboard.

SUMMARY OF THE INVENTION

Various aspects of the invention provide an alarm apparatus, an alarm system, an alarm method and a portable terminal that allow the driver focusing attention on the portable terminal to be easily aware of being in a situation in which the driver must start the manual driving, when the driver is required to start the manual driving in the automatic driving.

An alarm apparatus according to an aspect of the invention includes a control unit, the control unit being configured to be capable of communicating with a portable terminal, the portable terminal being used at a driver seat by a driver of a vehicle, the vehicle performing automatic driving, the control unit determining whether a distance or arrival time from the vehicle to a termination position for the automatic driving is a predetermined value or less, during the automatic driving, based on position information about the vehicle and map information, or based on surrounding environment information about the vehicle, the control unit being configured to display alarm information on a screen of the portable terminal, when it is determined that the distance or arrival time from the vehicle to the termination position for the automatic driving is the predetermined value or less, the alarm information prompting the driver to start manual driving.

The control unit of the alarm apparatus according to an aspect of the invention displays, on the screen of the portable terminal, the alarm information prompting the driver to start the manual driving, when it is determined that the distance or arrival time to the termination position for the automatic driving is the predetermined value or less. Therefore, the alarm apparatus allows the driver focusing attention on the portable terminal to be easily aware of being in a situation in which the driver must start the manual driving, compared to the case where the alarm information is displayed on only the display secured to the dashboard, or the like.

In an embodiment, the alarm information may include information relevant to a steering operation, an accelerator operation or a brake operation. In this case, a specific operation for the manual driving such as the steering operation, the accelerator operation or the brake operation is displayed on the screen of the portable terminal, as the alarm information. Therefore, the alarm apparatus allows the driver to understand what operation is necessary, before the driver starts the manual driving.

In an embodiment, the control unit may display the alarm information on the screen of the portable terminal such that the shorter the distance or arrival time from the vehicle to the termination position for the automatic driving is, the greater a display degree is. In this case, the alarm information becomes greater as the vehicle comes closer to the termination position for the automatic driving. Therefore, the alarm apparatus allows the driver focusing attention on the portable terminal to be more easily aware of being in a situation in which the driver must start the manual driving, as the vehicle comes closer to the termination position for the automatic driving.

In an embodiment, the control unit may determine whether the driver has started the manual driving, and may terminate the display of the alarm information on the portable terminal when it is determined that the driver has started the manual driving. In this case, the alarm apparatus can terminate the display of the alarm information that is unnecessary for the driver having started the manual driving.

In an embodiment, the control unit may compare a normative driving operation and a driving operation by the driver, and may determine whether the driver has started the manual driving, based on a comparison result, the normative driving operation being computed based on the surrounding environment information about the vehicle. In this case, the alarm apparatus can determine that the manual driving is adequately being performed by the driver, in the light of the normative driving operation, and therefore, it is possible to avoid, for example, by a wrong operation, determining that the driver has started the manual driving, and terminating the display of the alarm information.

Further, an alarm system according to an alternative aspect of the invention includes: a portable terminal that is used at a driver seat by a driver of a vehicle, the vehicle performing automatic driving; and a control unit that is configured to be capable of communicating with the portable terminal, the control unit determining whether a distance or arrival time from the vehicle to a termination position for the automatic driving is a predetermined value or less, during the automatic driving, based on position information about the vehicle and map information, or based on surrounding environment information about the vehicle, the control unit being configured to display alarm information on a screen of the portable terminal, when it is determined that the distance or arrival time from the vehicle to the termination position for the automatic driving is the predetermined value or less, the alarm information prompting the driver to start manual driving.

Further, an alarm method for the vehicle according to a further alternative aspect of the invention includes: a step of determining whether a distance or arrival time from a vehicle to a termination position for automatic driving is a predetermined value or less, during the automatic driving of the vehicle, based on position information about the vehicle and map information, or based on surrounding environment information about the vehicle; and a step of displaying alarm information on a screen of a portable terminal, when it is determined that the distance or arrival time from the vehicle to the termination position for the automatic driving is the predetermined value or less, the alarm information prompting the driver to start manual driving.

Further, a portable terminal according to a further alternative aspect of the invention includes: a screen; and a control unit that is configured to be capable of communicating with a vehicle, the vehicle performing automatic driving, the control unit determining whether a distance or arrival time from the vehicle to a termination position for the automatic driving is a predetermined value or less, through communication with the vehicle during the automatic driving, based on position information about the vehicle and map information, or based on surrounding environment information about the vehicle, the control unit being configured to display alarm information on the screen, when it is determined that the distance or arrival time from the vehicle to the termination position for the automatic driving is the predetermined value or less, the alarm information prompting the driver of the vehicle to start manual driving.

The above alarm system, alarm method and portable terminal, similarly to the above-described alarm apparatus, allow the driver focusing attention on the portable terminal to be easily aware of being in a situation in which the driver must start the manual driving, compared to the case where the alarm information is displayed on only the display secured to the dashboard, or the like.

According to the various aspects and embodiments of the invention, it is possible to provide an alarm apparatus, an alarm system and a portable terminal that allow the driver focusing attention on the portable terminal to be easily aware of being in a situation in which the driver must start the manual driving, when the driver is required to start the manual driving in the automatic driving.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A is a diagram showing exemplary screens on which alarm information for having a driver start manual driving is displayed;

FIG. 3B is a diagram showing exemplary screens on which alarm information for having a driver start manual driving is displayed;

FIG. 3C is a diagram showing exemplary screens on which alarm information for having a driver start manual driving is displayed;

FIG. 3D is a diagram showing exemplary screens on which alarm information for having a driver start manual driving is displayed;

FIG. 4 is a diagram for describing a relation between the distance from a vehicle to a termination position for automatic driving and the alarm information to be displayed on the screen of a portable terminal;

FIG. 5 is a diagram for describing the termination of the display of the alarm information at the start time of manual driving;

DETAILED DESCRIPTION OF EMBODIMENTS

Figure 1:
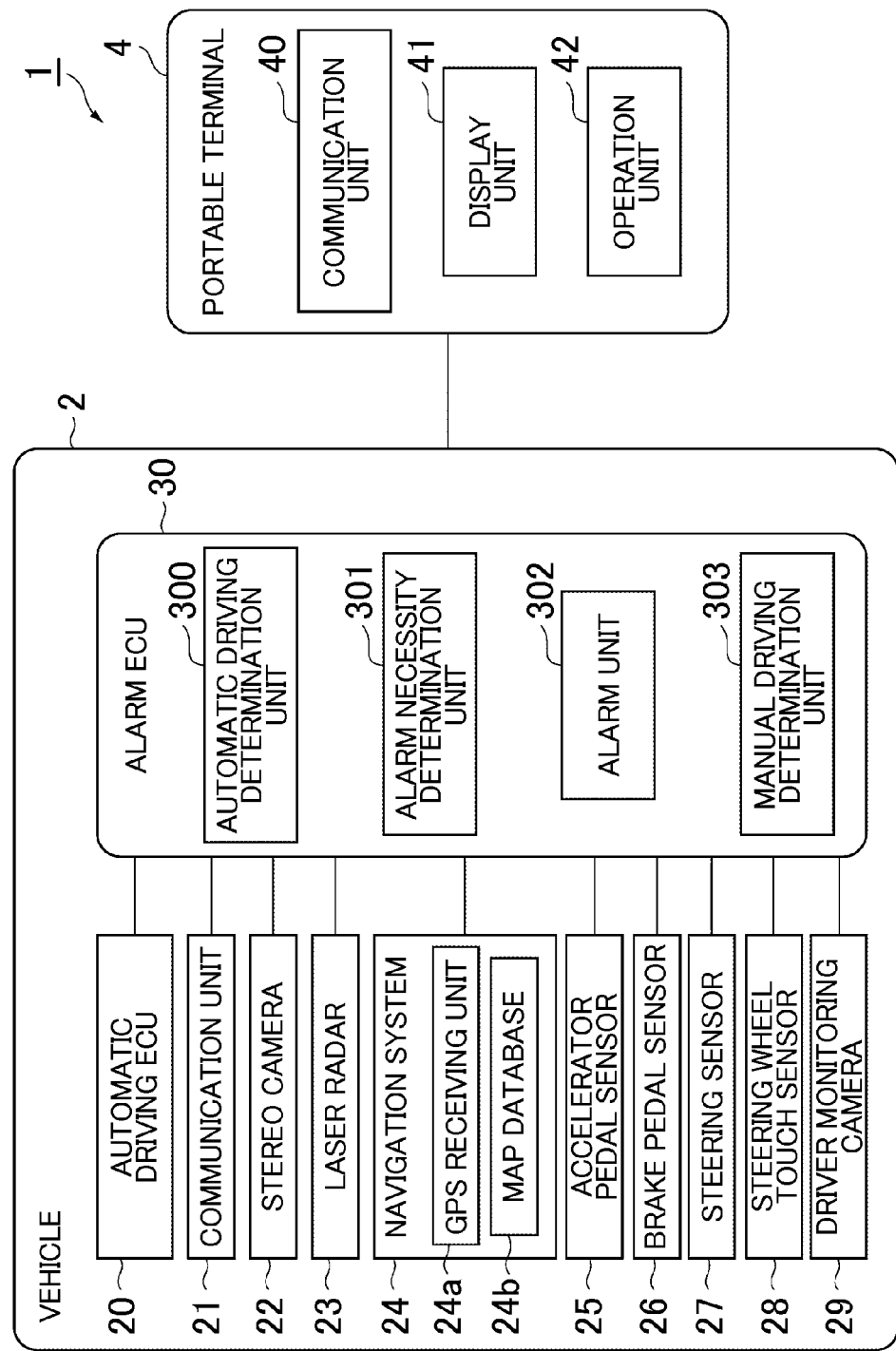
FIG. 1 is a block diagram showing a configuration of an alarm system according to a first embodiment.

Hereinafter, embodiments of the invention will be described with reference to the drawings. Here, in the following description, for identical or corresponding elements, identical reference characters are assigned, and repetitive descriptions are omitted.

First Embodiment

FIG. 1 is a block diagram showing a configuration of an alarm system 1 according to a first embodiment. The alarm system 1 shown in FIG. 1, for example, is a system in which a vehicle 2 such as a passenger car and a portable terminal 4 of a driver of the vehicle 2 communicate and exchange information, and that alarms the driver of the vehicle 2 through the portable terminal 4.

The vehicle 2 is equipped with an automatic driving ECU (Electronic Control Unit) 20. The automatic driving ECU 20 is an electronic control unit that includes a CPU (Central Processing Unit), a ROM (Read Only Memory), a RAM (Random Access Memory) and the like. The automatic driving ECU 20, in which a program stored in the ROM is loaded into the RAM and is executed by the CPU, executes various vehicle controls. The automatic driving ECU 20 may be constituted by multiple electronic control units. The automatic driving ECU 20, which is connected with sensors described later or a navigation system, controls the running of the vehicle 2, based on the information acquired from the sensors described later or the navigation system.

The automatic driving ECU 20 switches the driving state of the vehicle 2 between automatic driving and manual driving. The automatic driving, for example, is a driving state in which the vehicle 2 automatically runs along a road on which the vehicle 2 runs. The automatic driving, for example, includes a driving state in which the vehicle 2 automatically runs toward a previously set destination, without the driving operation by the driver.

The automatic driving is actualized by automatic steering (the automatic driving for steering) and automatic speed regulation (the automatic driving for speed). The automatic steering is a driving state in which the steering of the vehicle 2 is automatically controlled. In the embodiment, the automatic steering, for example, is a control to automatically perform the steering of the vehicle 2 such that the vehicle 2 does not depart from a running lane. Even when the driver does not perform the steering operation, the steering of the vehicle 2 is automatically performed along the running lane. The automatic speed regulation is a driving state in which the speed of the vehicle 2 is automatically controlled. The automatic speed regulation, for example, is a control in which a constant speed control to make the vehicle 2 perform a constant speed running at a setting speed previously set is performed when a leading vehicle is not in front of the vehicle 2, and a follow-up control to regulate the vehicle speed of the vehicle 2 depending on the inter-vehicle distance from the leading vehicle is performed when the leading vehicle is in front of the vehicle 2.

The manual driving, for example, is a driving state in which the vehicle 2 runs mainly in response to the driving operation by the driver. The manual driving, for example, includes a driving state in which the vehicle 2 runs based on only the driving operation by the driver. Here, the manual operation according to the embodiment includes a driving state in which a driving operation support control to support the driving operation by the driver is performed while the driving operation by the driver is mainly adopted. The driving operation support control, for example, is a control to assist the steering torque when the vehicle 2 runs along a curve, such that the steering by the driver has an adequate steering amount based on the curvature of the curve. The driving operation support control includes also a guidance control to perform guidance such that the steering direction by the driver is an adequate steering direction, for example, by giving torque to a steering wheel. The driving operation support control may support the accelerator operation (for example, the operation of an accelerator pedal) or brake operation (for example, the operation of a brake pedal) by the driver. Meanwhile, the driving operation support control does not include a control to make the vehicle 2 automatically run by forcibly interfering with the driving operation by the driver.

The automatic driving ECU 20 starts the automatic driving when the driver performs an operation for automatic driving start. The operation for automatic driving start, for example, is an operation to press an automatic driving start switch provided on the steering wheel. The automatic driving ECU 20 cancels the automatic driving, for example, when the driver performs an operation for automatic driving cancel. The operation for automatic driving cancel, for example, is an operation to press an automatic driving cancel switch provided on the steering wheel. Further, the automatic driving ECU 20 may cancel the automatic driving in the case where a driving operation with an operation amount exceeding a previously set acceptable operation amount for the automatic driving is performed, as exemplified by the case where the driver performs a sudden brake operation during the automatic driving. That is, the driver can switch from the automatic driving to the manual driving, by his own operation (intention).

Furthermore, the automatic driving ECU 20 switches the driving state of the vehicle 2 from the automatic driving to the manual driving, when it is determined that the vehicle 2 during the automatic driving has arrived at a termination position for the automatic driving. The termination position for the automatic driving is a position that is a basis for the switching of the driving state of the vehicle 2 from the automatic driving to the manual driving. The termination position for the automatic driving, for example, is a position at a boundary between a road environment allowing the automatic driving to be continued and a road environment not allowing the automatic driving to be continued, on a course of the vehicle 2. That is, when the automatic driving cannot be continued, the automatic driving ECU 20 switches from the automatic driving to the manual driving automatically (without requiring the permission or non-permission of the driver). Here, the termination position for the automatic driving can be set to a position at a predetermined distance, which is closer to the vehicle 2 side (near side), from the position at the boundary between the road environment allowing the automatic driving to be continued and the road environment not allowing the automatic driving to be continued, on a course of the vehicle 2.

In the case of the automatic driving for an expressway, the road environment not allowing the automatic driving to be continued means an environment of a road (for example, a general road) other than the expressway. That is, the termination position in the automatic driving for the expressway may be the position of an expressway exit that is a boundary between the expressway allowing the automatic driving to be continued and the general road not allowing the automatic driving to be continued. Here, the automatic driving for the expressway is an automatic driving that can be executed in the environment of the expressway.

Alternatively, the road environment not allowing the automatic driving to be continued may be an environment in which an obstacle such as a pedestrian is on the course of the vehicle 2. In this case, the termination position for the automatic driving may be, on the course of the vehicle 2, a position just before the obstacle such as a pedestrian. Further, the road environment not allowing the automatic driving to be continued may be a road on which the automatic driving is impossible, as exemplified by a sharp curve, a connection type road (a branched road, a junction road or the like), and a road whose lane width is a predetermined value or less. In this case, the termination position for the automatic driving may be, on the course of the vehicle 2, a position that is a boundary between a road in a form enabling the automatic driving running, as exemplified by a straight, and a road in a form not enabling the automatic driving running. Further, the road environment not allowing the automatic driving to be continued may be a traffic situation or weather in which the automatic driving is impossible, and for example, may be a road environment such as construction, traffic congestion, heavy rain or snow cover. In this case, the termination position for the automatic driving may be, on the course of the vehicle 2, a position that is a boundary between a road in an ordinary traffic situation or weather and a road in a traffic situation or weather in which the automatic driving is impossible.

Furthermore, the road environment not allowing the automatic driving to be continued may be an environment in which the information necessary for the automatic driving cannot be acquired. As the road environment not allowing the automatic driving to be continued, for example, there are a case where a white line on a road is blurred by aged deterioration, construction or the like, a case where a white line is interrupted, a case where in a tunnel exit or the like, a forward sight of the vehicle is imaged against backlight, and the like. In such environments, there is a possibility that the vehicle 2 cannot acquire the information necessary for the automatic driving. In this case, for example, the termination position for the automatic driving may be, on the course of the vehicle 2, a position that is a boundary between a road environment allowing for the recognition of a white line (a lane line, a vehicular lane line or the like) on a road along which the vehicle 2 runs, and a road environment not allowing for the recognition of the white line of the road due to the aged deterioration, the construction or the like.

The automatic driving ECU 20 recognizes the road environment not allowing the automatic driving to be continued, based on surrounding environment information, and derives the termination position for the automatic driving. The surrounding environment information is the information that is obtained by in-vehicle sensors described later, a navigation system, inter-vehicle communication, road-vehicle communication or a combination of them. The detail of the surrounding environment information will be described later. For example, the automatic driving ECU 20 may acquire the information (surrounding environment information) detected by the in-vehicle sensors, to derive the termination position for the automatic driving. Alternatively, the automatic driving ECU 20 may acquire the information (surrounding environment information) relevant to the road environment not allowing the automatic driving to be continued that is determined by another vehicle, through the inter-vehicle communication or the road-vehicle communication, to derive the termination position for the automatic driving. Alternatively, the automatic driving ECU 20 may acquire the termination position (surrounding environment information) for the automatic driving of another vehicle, through the inter-vehicle communication or the road-vehicle communication, to derive the termination position for the automatic driving. The information acquired through the communication may include the history information about the termination position for the automatic driving of the other vehicle. In the case where the termination position for the automatic driving of another vehicle is acquired through the communication, the termination position for the automatic driving may be, for example, a position where a leading vehicle to the vehicle 2 or the like terminates the automatic driving for some reason. Alternatively, the automatic driving ECU 20 may acquire the history information about the vehicle 2, to derive the termination position for the automatic driving. Here, the automatic driving ECU 20 may determine, during the running of the vehicle 2, whether the road environment does not allow the automatic driving to be continued. In this case, depending on the determination result, the current position of the vehicle 2 can be the termination position for the automatic driving.

Alternatively, the automatic driving ECU 20, for example, may derive (set) the termination position for the automatic driving, based on the position information about the vehicle 2, the map information and the guide route information that are from a navigation system 24 described later. For example, when the vehicle 2 is in the automatic driving for the expressway, the automatic driving ECU 20 derives the position of an expressway exit through which the vehicle 2 is going to pass, as the termination position for the automatic driving, based on the position information of the vehicle 2, the map information and the guide route information that are from the navigation system 24.

The alarm system 1 includes an alarm ECU 30 (an example of the alarm apparatus) and the portable terminal 4 (an example of the portable terminal). The alarm ECU 30 is mounted in the vehicle 2. The alarm ECU 30 is an electronic control unit that includes a CPU, a ROM, a RAM and the like. The alarm ECU 30 may be configured to be capable of referring to a storage device not illustrated. The alarm ECU 30 executes various vehicle controls, for example, by referring to the storage device to acquire data, loading a program stored in the ROM into the RAM, and executing the program with the CPU. The alarm ECU 30 may be constituted by multiple electronic control units. The alarm ECU 30 is configured to be capable of communicating with the portable terminal 4 of the driver, and alarms the driver of the vehicle 2 that performs the automatic driving, using the portable terminal 4. The alarm in the embodiment, for example, means a reminder relevant to the driving state of the vehicle 2.

The portable terminal 4 is a portable terminal to be used at a driver seat by the driver of the vehicle 2 that performs the automatic driving. The "to be used at the driver seat by the driver" means to fulfill the function of the portable terminal when the driver is at the driver seat. The function of the portable terminal includes a display function. For example, the case where the driver browses Web pages, still images, moving images or emails, or makes an application such as a game executed at the driver seat corresponds to the "to be used at the driver seat by the driver". Further, the "to be used at the driver seat" means the use within a predetermined space region containing the driver seat, and for example, means the case of the use within arm's reach by the driver sitting at the driver seat. That is, the "to be used at the driver seat" only has to be a state of being operable by the driver, and is not limited to the case where the driver uses the portable terminal 4 in his hand.

The portable terminal 4 is a computer that can be carried, and for example, is a mobile phone, a PDA (Personal Digital Assistant), a tablet, a laptop or the like. The portable terminal 4, for example, is an apparatus that includes a CPU (not illustrated), a storage unit (not illustrated), a communication unit 40, a display unit 41 (screen) and an operation unit 42. The communication unit 40 is a communication device such as a network circuit that controls communication. The communication unit 40 communicates with the vehicle 2, for example, using a wireless LAN (Local Area Network), Bluetooth (R) or the like. The display unit 41 is a display device such as a display. The operation unit 42 is an input device that accepts an operation input. In the portable terminal 4, various applications such as a moving image application and an email application can be installed. The portable terminal 4 makes the above-described constituent elements work, and thereby, can execute the display of Web pages, still images, moving images or emails, or an application such as a game. Further, the portable terminal 4 communicates with the alarm ECU 30 through the communication unit 40, and displays the alarm information for having the driver start the manual driving, on the display unit 41. The detail of the alarm information will be described later. The alarm ECU 30 may authenticate that the portable terminal 4 is a portable terminal of the driver, by a widely known technique. Further, the position and use state of the portable terminal 4 may be grasped by a widely known technique. In this case, based on the position and use state, the alarm ECU 30 can recognize that the communicating portable terminal is the portable terminal 4 that the driver of the vehicle 2 is using at the driver seat.

Figure 2:
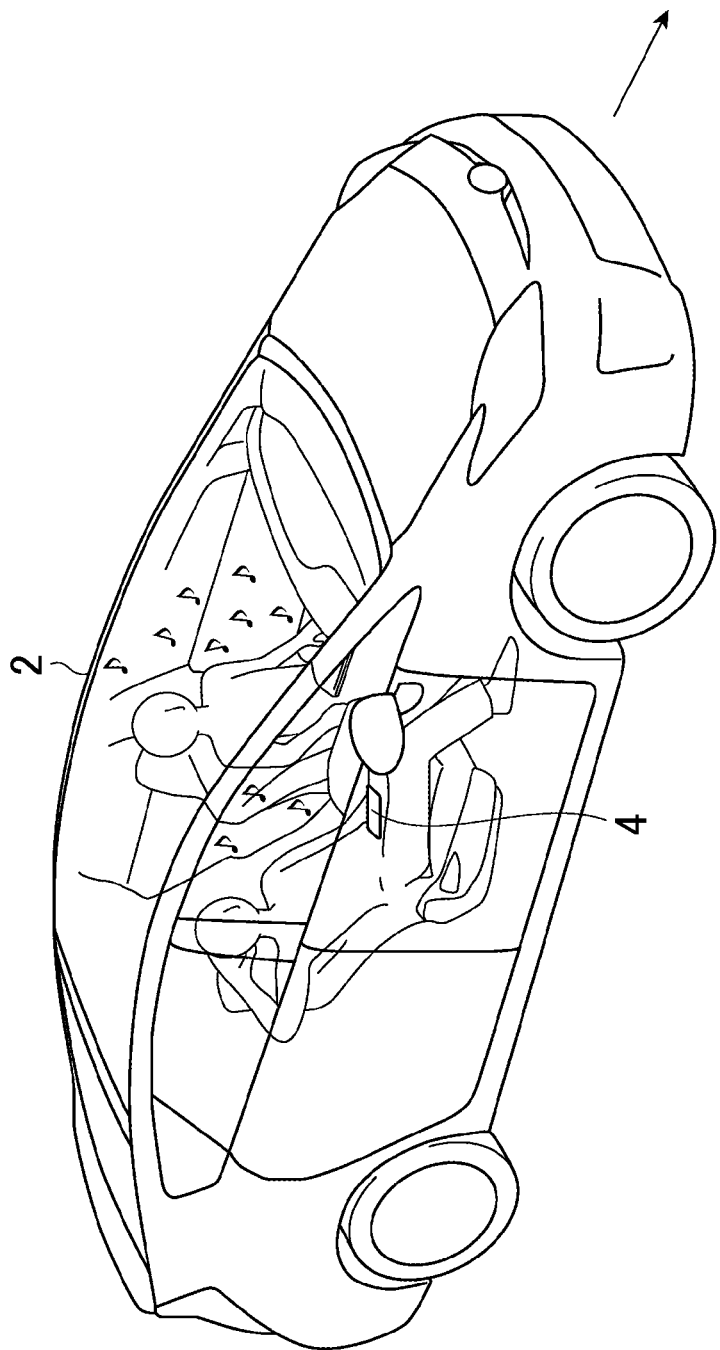
FIG. 2 is a diagram for describing a situation in which the alarm system according to the first embodiment works.

A situation in which the alarm ECU 30 performs the alarm will be described using FIG. 2. FIG. 2 is a diagram for describing a situation in which the alarm system 1 according to the embodiment works. The vehicle 2 shown in FIG. 2 is running by the automatic driving. In some cases, within the vehicle 2 during the automatic driving, the driver is doing something other than the monitoring of the driving situation of the vehicle 2. For example, the driver shown in FIG. 2 is in a situation in which his attention is directed to the portable terminal 4 at the hand of the driver. That is, in the situation, the driver does not pay attention to the driving state of the vehicle 2, the driving situation and the ambient environment, during the automatic driving, and is performing an operation such as the browsing of Web pages, still images, moving images, emails or the like, a game, or an email creation.

In such a situation, in the case where the vehicle 2 in the automatic driving runs toward the road environment not allowing the automatic driving to be continued, the automatic driving ECU 20 derives the termination position for the automatic driving, and switches the driving state of the vehicle 2 from the automatic driving to the manual driving when it is determined that the vehicle 2 in the automatic driving has arrived at the termination position for the automatic driving. That is, since it is difficult to continue the automatic driving, the automatic driving ECU 20 switches from the automatic driving to the manual driving at the termination position for the automatic driving, regardless of the intention of the driver. In this case, it is necessary to alarm the driver to start the manual driving. The alarm may be displayed on a display secured to a dashboard, or the like. However, when the driver directs his attention to the portable terminal 4, the alarm using the display secured to the dashboard or the like is not effective. Therefore, the alarm ECU 30 displays the alarm information for having the driver start the manual driving, on the display unit 41 of the portable terminal 4. This allows the driver focusing attention on the portable terminal 4 to be easily aware of being in a situation in which the driver must start the manual driving, compared to the case where the alarm information is displayed on only the display secured to the dashboard, or the like.

The alarm ECU 30, for example, is connected with the automatic driving ECU 20, a communication unit 21, a stereo camera 22, a laser radar 23, the navigation system 24, an accelerator pedal sensor 25, a brake pedal sensor 26, a steering sensor 27, a steering wheel touch sensor 28, and a driver monitoring camera 29, and is configured to be capable of exchanging information with the constituent elements.

The automatic driving ECU 20 outputs, to the alarm ECU 30, the information allowing for the identification of whether the automatic driving of the vehicle 2 is being executed. Further, the automatic driving ECU 20 may output, to the alarm ECU 30, the information relevant to the termination position for the automatic driving.

The communication unit 21 acquires a variety of information through a wireless communication network (for example, a communication network for mobile phones, a communication network for VICS (Vehicle Information and Communication System) (R), or the like). The communication unit 21, for example, acquires the road environment information on the course of the vehicle 2 by the road-vehicle communication with a computer in a facility such as an information management center that manages traffic information. The road-vehicle communication, for example, is the communication with the information management center or the like through a roadside transceiver (for example, an optical beacon, an ITS (Intelligent Transport Systems) spot, or the like) provided on a side of a road. The road-vehicle communication includes also the communication with the information management center or the like through the above-described wireless communication network.

Further, the communication unit 21 may acquire the information about another vehicle by the inter-vehicle communication. The communication unit 21, for example, acquires the position information about the other vehicle, the road environment information detected by the other vehicle, and the like, by the inter-vehicle communication. Further, the communication unit 21 communicates with the portable terminal 4 in the vehicle. For example, the communication unit 21, which is connected with the portable terminal 4 using a wireless LAN, Bluetooth or the like, receives the operation information accepted by the portable terminal 4, and sends the alarm information for having the driver start the manual driving, to the portable terminal 4. The alarm information will be described later.

The stereo camera 22, for example, includes two imaging units that are provided on the back surface of a windshield of the vehicle 2. The two imaging units are disposed so as to be arrayed in the vehicle width direction of the vehicle 2, and images a forward sight of the vehicle 2. The stereo camera 22 sends the imaging information about the forward sight of the vehicle, to the alarm ECU 30. Here, instead of the stereo camera 22, a monocular camera may be used.

The laser radar 23, for example, is provided on the front end of the vehicle 2, and detects an obstacle in front of the vehicle by utilizing laser. The laser radar 23, for example, sends laser in front of the vehicle, receives the laser reflected by an obstacle such as another vehicle, and thereby, detects the obstacle. The laser radar 23 outputs a signal corresponding to the detected obstacle, to the alarm ECU 30. Here, instead of the laser radar 23, a millimeter-wave radar or the like may be used.

The navigation system 24 guides the driver of the vehicle 2, to a destination set by the driver. The navigation system 24, for example, includes a GPS receiving unit 24a for measuring the position information about the vehicle 2, and a map database 24b in which the map information is stored. The GPS receiving unit 24a, for example, receives signals from three or more GPS satellites, and thereby, measures the position information (for example, the latitude and the longitude) about the vehicle 2. The map information of the map database 24b, for example, includes the position information about roads, the type information about roads, the information about road forms, and the like.

The navigation system 24 recognizes a running road and running lane along which the vehicle 2 runs, based on the position information about the vehicle 2 measured by the GPS receiving unit 24a and the map information of the map database 24b. The navigation system 24 computes a route from the position of the vehicle 2 to the destination, and guides the driver along the route by the display on a navigation display and the voice output from a speaker of the vehicle 2. The navigation system 24, for example, sends the position information about the vehicle 2, the information about the running road of the vehicle 2, and the information about the guide route for the vehicle 2, to the alarm ECU 30.

The accelerator pedal sensor 25, for example, is provided on a shaft part of an accelerator pedal of the vehicle 2, and detects the stepping quantity of the accelerator pedal (the position of the accelerator pedal). The accelerator pedal sensor 25 outputs a signal corresponding to the detected stepping quantity of the accelerator pedal, to the alarm ECU 30.

The brake pedal sensor 26, for example, is provided on a part of a brake pedal, and detects the stepping quantity of the brake pedal (the position of the brake pedal). The stepping quantity of the brake pedal may be detected from the operation force of the brake pedal (the stepping force to the brake pedal, the pressure of a master cylinder or the like).

The brake pedal sensor 26 outputs a signal corresponding to the detected stepping quantity or operation force of the brake pedal, to the alarm ECU 30.

The steering sensor 27, for example, is provided on a steering shaft of the vehicle 2, and detects the steering torque to be given to a steering wheel by the driver. The steering wheel touch sensor 28, for example, is provided on the steering wheel of the vehicle 2, and detects the contact of the driver with the steering wheel and the holding pressure of the driver to the steering wheel. Based on the detection results, the steering sensor 27 and the steering wheel touch sensor 28 send the steering information relevant to the steering by the driver, to the alarm ECU 30.

The driver monitoring camera 29, for example, is provided at a position that is on a cover of a steering column of the vehicle 2 and that is in front of the driver, and performs the imaging of the driver. For imaging the driver from multiple directions, multiple driver monitoring cameras 29 may be provided. The driver monitoring camera 29 sends the imaging information about the driver, to the alarm ECU 30.

The alarm ECU 30 includes an automatic driving determination unit 300, an alarm necessity determination unit (determination unit) 301, an alarm unit (alarm unit) 302, and a manual driving determination unit 303.

The automatic driving determination unit 300 acquires the information allowing for the identification of whether the automatic driving of the vehicle 2 is being executed, from the automatic driving ECU 20, and determines whether the vehicle 2 is in the execution of the automatic driving. The automatic driving determination unit 300, for example, acquires flag information that indicates "1" in the case of being in the automatic driving and indicates "0" in the case of being not in the automatic driving, from the automatic driving ECU 20. The automatic driving determination unit 300 outputs the determination result to the alarm necessity determination unit 301.

The alarm necessity determination unit 301 determines the necessity of the alarm, during the automatic driving of the vehicle 2. That is, in the case where the automatic driving determination unit 300 determines that the vehicle 2 is in the automatic driving, the alarm necessity determination unit 301 determines whether to display the alarm information on the display unit 41 of the portable terminal 4. The alarm information according to the embodiment is the information for having the driver start the manual driving, and is the information for performing the remainder associated with the termination of the automatic driving of the vehicle 2. For example, the alarm information is the information (distance information or the like) indicating that the vehicle 2 is close to the termination position for the automatic driving. Alternatively, the alarm information may be the information (the information about the remaining time, or the like) indicating a situation in which the driver must start the manual driving immediately or in a predetermined time. The alarm information may include the information indicating a driving operation that the driver should start. For example, the alarm information may include the information relevant to the steering operation, the accelerator operation or the brake operation. The alarm information may be provided to the driver, along with an alarm sound, a voice, the vibration of the portable terminal or the like.

Specifically, the alarm necessity determination unit 301, during the automatic driving, determines whether the distance from the vehicle 2 to the termination position for the automatic driving is a predetermined value or less, based on the position information about the vehicle 2 and the map information. First, the alarm necessity determination unit 301 acquires the position information about the vehicle 2. The position information about the vehicle 2, for example, is acquired from the navigation system 24, and includes the current position of the vehicle 2. Then, the alarm necessity determination unit 301 acquires the termination position for the automatic driving, for example, from the automatic driving ECU 20. Alternatively, the alarm necessity determination unit 301 may acquire the termination position for the automatic driving from the navigation system 24. For example, in the case where the automatic driving ECU 20 performs the automatic driving for an expressway, the alarm necessity determination unit 301 can acquire the position of an expressway exit, from the information about a guide route for the vehicle 2 and the map information. Alternatively, in the case where the automatic driving ECU 20 performs the automatic driving for the expressway and where the information about the guide route for the vehicle 2 is not present, the alarm necessity determination unit 301 can recognize the travelling direction from the position information about the vehicle 2, and can acquire the position of an expressway exit in the travelling direction of the vehicle 2, from the map information. Then, for example, based on the current position of the vehicle 2 and the position of the expressway exit acquired, the alarm necessity determination unit 301 derives the distance from the current position of the vehicle 2 to the termination position for the automatic driving. Then, the alarm necessity determination unit 301 determines whether the derived distance is the predetermined value or less. The predetermined value is a threshold for determining whether the distance is a distance at which the notice of the alarm information should be given to the driver, and can be set in a range of 50 m to 3 km, for example.

Alternatively, during the automatic driving, the alarm necessity determination unit 301 may determine whether the distance from the current position of the vehicle 2 to the termination position for the automatic driving is a predetermined value, based on the surrounding environment information about the vehicle 2. The predetermined value in this case also can be set similarly to the above. The surrounding environment information is the information about the surrounding environment of the vehicle 2, and is the information by which the alarm necessity determination unit 301 derives the distance from the current position of the vehicle 2 to the termination position for the automatic driving. For example, the surrounding environment information includes the information of whether there is an obstacle such as a pedestrian in the periphery of the vehicle 2, the information of whether there is a curve whose curvature radius is a predetermined value or less, the information of whether there is a branched road or a junction road, the information of whether there is a place under construction or in a traffic congestion, the information of whether there is a region where the weather is worsening, and the like. The periphery of the vehicle 2, for example, is a range from the current position of the vehicle to a position at a predetermined distance in front of the vehicle, and the predetermined distance can be set, for example, in a range of 100 m to 5 km. The surrounding environment information is acquired through the communication unit 21, the stereo camera 22, the laser radar 23 or the navigation system 24. The alarm necessity determination unit 301 may derive the termination position for the automatic driving, based on the surrounding environment information. Alternatively, the alarm necessity determination unit 301 may acquire, from the automatic driving ECU 20, the termination position for the automatic driving that the automatic driving ECU 20 calculates based on the surrounding environment information. In either case, the alarm necessity determination unit 301 determines whether the distance from the current position of the vehicle 2 to the termination position for the automatic driving is the predetermined value or less, using the termination position for the automatic driving calculated based on the surrounding environment information.

Here, the alarm necessity determination unit 301 may calculate the distance from the current position of the vehicle 2 to the termination position for the automatic driving, and may calculate the arrival time from the current position of the vehicle 2 to the termination position for the automatic driving, assuming that the current speed is a constant speed from the current position of the vehicle 2 to the termination position for the automatic driving. Then, the alarm necessity determination unit 301 may determine whether the calculated arrival time is a predetermined value or less. The predetermined value in this case is a threshold for determining whether the timing is a timing at which the notice should be given to the driver, and can be set in a range of 5 seconds to 130 seconds, for example. Similarly to the case of calculating the distance, in the case of using the arrival time, the alarm necessity determination unit 301 may receive the termination position for the automatic driving from the automatic driving ECU 20, or the alarm necessity determination unit 301 itself may compute the termination position for the automatic driving. In either case, the termination position for the automatic driving is computed based on the position information about the vehicle 2 and the map information, or based on the surrounding environment information about the vehicle. Therefore, even when either unit computes the termination position for the automatic driving, the alarm necessity determination unit 301 determines whether the distance or arrival time to the termination position for the automatic driving is the predetermined value or less, based on the position information about the vehicle 2 and the map information, or based on the surrounding environment information for the vehicle.

When the alarm necessity determination unit 301 determines that the distance or arrival time to the termination position for the automatic driving is the predetermined value or less, the alarm unit 302 displays the alarm information for having the driver start the manual driving, on the display unit 41 of the portable terminal 4. The alarm unit 302, for example, is configured to be capable of referring to the alarm information stored in the storage device. Alternatively, the alarm unit 302 may generate the alarm information each time, or may send, to the portable terminal 4, the information for generating the alarm information, to make the portable terminal 4 generate the alarm information.

FIGS. 3A to 3D are diagrams showing exemplary screens on which the alarm information for having the driver start the manual driving is displayed. FIG. 3A is an example in which an image G1 showing the time before the automatic driving of the vehicle 2 is terminated is displayed on the screen of the portable terminal 4. That is, the image G1 is an example of the alarm information in the embodiment. The image G1 contains the character information of "automatic driving" and "xx seconds". The "xx seconds" shows the remaining time before the automatic driving of the vehicle 2 is terminated. The remaining time "xx seconds" before the automatic driving of the vehicle 2 is terminated may be identical to the arrival time from the current position of the vehicle 2 to the termination position for the automatic driving, or may be a time that is shorter than the arrival time by a predetermined time. The image G1 is displayed so as to occupy a part of the screen of the portable terminal 4. For example, when the driver watches a content such as a Web page or a moving image, the image G1 is displayed so as to occupy a part of the screen of the portable terminal 4 while being superimposed on the content that is watched by the driver. That is, the image G1 is displayed in a manner of being visible for the driver. Here, the background of the image G1 may be transparent or semitransparent. Here, the time "xx seconds" before the automatic driving of the vehicle 2 is terminated may be displayed in the form of a countdown. Further, the distance until the automatic driving of the vehicle 2 is terminated may be displayed. Since the image G1 is displayed on the screen of the portable terminal 4, the driver can know the termination of the automatic driving and the timing of the termination of the automatic driving, and therefore, can understand a situation in which the driver must start the manual driving immediately or in a predetermined time.

FIGS. 3B to 3D are examples in which images G2 to G4 showing driving operations that the driver should perform are displayed on the screen of the portable terminal 4. FIG. 3B is an exemplary image for having the driver start the steering operation. That is, the image G2 is an example of the alarm information in the embodiment. The arrows in the figure prompt the driver to hold the steering wheel with his hands, and the driver can easily understand that the driver must start the manual driving by the steering operation. FIG. 3C is an exemplary image for having the driver start the accelerator operation. That is, the image G3 is an example of the alarm information in the embodiment. The arrow in the figure prompts the driver to step the accelerator pedal with his foot, and the driver can easily understand that the driver must start the manual driving by the accelerator operation. FIG. 3D is an exemplary image for having the driver start the brake operation. That is, the image G3 is an example of the alarm information in the embodiment. The arrow in the figure prompts the driver to step the brake pedal with his foot, and the driver can easily understand that the driver must start the manual driving by the brake operation. Similarly to the image G1, the images G2 to G4 are displayed so as to occupy a part of the screen of the portable terminal 4 while being superimposed on the content that is watched by the driver.

The alarm unit 302 may select an image from the images G1 to G4 shown in FIGS. 3A to 3D, based on the driving operation that the driver should perform at the current position of the vehicle 2 or in front of the vehicle 2, and may display the image on the portable terminal 4. In this case, it is only necessary that the information relevant to the images G1 to G4 is associated with the driving operation that the driver should perform at the current position of the vehicle 2 or in front of the vehicle 2, and is stored in the storage device to which the alarm unit 302 can refer. For example, the alarm unit 302 predicts a driving operation that is necessary at the current position of the vehicle 2 or in front of the vehicle 2. For example, the alarm unit 302 predicts the necessary driving operation, based on the road form at the current position of the vehicle 2 or in front of the vehicle 2. Specifically, in the case where there is a curve at the current position of the vehicle 2 or in front of the vehicle 2, it is predicted that the necessary driving operation is the steering operation. Then, the alarm unit 302 selects the image G2 prompting the steering operation, from the referable storage device, and displays the image G2 on the portable terminal 4. Alternatively, the alarm unit 302 may generate the image G2 prompting the steering operation, and may display the image G2 on the portable terminal 4. Further, in the case where there is a straight and rising road at the current position of the vehicle 2 or in front of the vehicle 2, the alarm unit 302 selects or generates the image G3 prompting the accelerator pedal operation, and displays the image G3 on the portable terminal 4. Alternatively, in the case where there is a straight and declining road at the current position of the vehicle 2 or in front of the vehicle 2, the alarm unit 302 selects or generates the image G4 prompting the brake pedal operation, and displays the image G4 on the portable terminal 4. For example, in the case where multiple driving operations are necessary, the alarm unit 302 displays an image prompting an operation that should be performed first, on the portable terminal 4.

Further, the alarm unit 302 may display the image G1 and images G2 to G4 shown in FIGS. 3A to 3D, on the portable terminal 4, depending on the distance or arrival time from the vehicle 2 to the termination position for the automatic driving. In this case, it is only necessary that the images G1 to G4 are associated with the distance or arrival time from the vehicle 2 to the termination position for the automatic driving, and is stored in the storage device to which the alarm unit 302 can refer.

Further, the alarm unit 302 may perform the display on the screen of the portable terminal 4, such that the shorter a distance LX from the vehicle 2 to the termination position for the automatic driving is, the greater the display degree of an image GX is. The display degree is an index of the intensity of the display manner of the image GX to be displayed on the screen of the portable terminal 4. For example, the greater the image GX is, the greater the display degree is. The display degree may involve other than the size of the image GX. For example, the lower the transparency of the image GX is, the greater the display degree of the image GX is. Alternatively, the higher the luminance value of the image GX is, the greater the display degree of the image GX is. Further, in the case where the display of the content other than the image GX is terminated, the display degree of the image GX is greater, compared to the case where the image GX is displayed so as to be superimposed on the content. Furthermore, in the case where the image GX is displayed so as to blink, the display degree of the image GX is greater, compared to the case where the image GX is displayed so as not to blink. Here, the alarm unit 302 may alter the display degree of the images G1 to G4, using a coefficient associated with the distance or arrival time from the vehicle 2 to the termination position for the automatic driving. Here, the alarm unit 302 does not always need to alter the images G1 to G4, and may adopt a constant display degree.

In the following, a case where the alarm unit 302 displays the alarm information depending on the distance from the vehicle 2 to the termination position for the automatic driving will be described as an example.

FIG. 4 is a diagram for describing a relation between the distance from the vehicle 2 to the termination position for the automatic driving and the alarm information to be displayed on the screen of the portable terminal 4. FIG. 4 shows, as an example, a case where a termination position F1 for the automatic driving of the vehicle 2 is an expressway exit 50. Then, FIG. 4 shows the relation between the distance LX (X is an integer) from a current position PX (X is an integer) of the vehicle 2 to the position of the expressway exit 50 (the termination position F1 for the automatic driving) and the alarm information (the images G1 to G4) to be displayed on the screen of the portable terminal 4. In FIG. 4, it is assumed that the vehicle 2 is performing the automatic driving from a position P0 toward the expressway exit 50 and the driver is viewing a content such as a moving image in the portable terminal 4 within the vehicle. Time t at each position PX is expressed as TX (X is an integer). Further, between the position P0 and a position P1, there is a position F2 a predetermined distance K (predetermined value) away from the termination position F1 for the automatic driving. The distance K is a distance that is previously set for determining whether to perform the alarm for the start of the manual driving.

In the case of time T0, the vehicle 2 is at the position P0. A distance L0 from the position P0 to the termination position F1 for the automatic driving is greater than the distance K from the position F2 to the termination position F1 for the automatic driving. Therefore, the alarm unit 302 does not display the alarm information on the screen of the portable terminal 4. In the figure, the content of a moving image for a cat is displayed on the screen of the portable terminal 4, with no change.

Then, the vehicle 2 continues running toward the expressway exit 50 by the automatic driving, and at time T1, is at the position P1. A distance L1 from the position P1 to the termination position F1 for the automatic driving is the distance K or less. Therefore, the alarm unit 302 displays the image G1 as the alarm information on the screen of the portable terminal 4, through communication. Here, the alarm unit 302 displays the image G1 decided based on the distance L1 such that the image G1 is superimposed on the content. In the image G1, the time (here, 100 seconds) before the automatic driving termination is displayed.

At time T2, the vehicle 2 is at a position P2. A distance L2 from the position P2 to the termination position F1 for the automatic driving is the distance K or less. Therefore, the alarm unit 302 continuously displays the image G1 as the alarm information on the screen of the portable terminal 4. The alarm unit 302 displays the image G1 decided based on the distance L2 such that the image G1 is superimposed on the content. In the image G1, the time (here, 10 seconds) before the automatic driving termination is displayed. Here, when the time before the auto driving termination becomes a predetermined time (for example, 40 seconds or less), or when the distance LX becomes a predetermined distance (for example, 90 m or less), the alarm unit 302 may concurrently perform an alarm such as vibration or alarm sound, in addition to the display of the alarm information.

At time T3, the vehicle 2 is at a position P3. A distance L3 from the position P3 to the termination position F1 for the automatic driving is the distance K or less. Therefore, the alarm unit 302 continuously displays the alarm information on the screen of the portable terminal 4. The alarm unit 302 displays the image G2 decided based on the distance L3 such that the image G2 is superimposed on the content. The alarm unit 302 may alter the type of the image, based on the distance LX. Here, through communication, the alarm unit 302 displays the image G2 for the start of the steering operation, as the alarm information, on the portable terminal 4.

At time T4, the vehicle 2 is at a position P4. A distance L4 from the position P4 to the termination position F1 for the automatic driving is the distance K or less. Therefore, the alarm unit 302 continuously displays the alarm information on the screen of the portable terminal 4. The alarm unit 302 displays the image G2 decided based on the distance L4 such that the image G2 is superimposed on the content. For example, through communication, the alarm unit 302 displays the image G2 for the start of the steering operation, as the alarm information, on the screen of the portable terminal 4. The alarm unit 302 may alter the size of the image, based on the distance LX. The alarm unit 302 increases the size of the image G2 to be displayed at the position P4, relative to the size of the image G2 to be displayed at the position P3, and then displays the image G2 on the screen of the portable terminal 4. The alarm unit 302 may increase the size itself of the image G2, and then may send the image G2 to the portable terminal 4. Alternatively, the alarm unit 302 may send the information relevant to the magnification, to the portable terminal 4, and the portable terminal 4 may resize the image G2 in consideration of the magnification, to display the image G2 on the screen.

At time T5, the vehicle 2 is at a position P5. A distance L5 from the position P5 to the termination position F1 for the automatic driving is the distance K or less. Therefore, the alarm unit 302 continuously displays the alarm information on the screen of the portable terminal 4. When the time before the automatic driving termination becomes a predetermined time (for example, 5 seconds or less), or when the distance LX becomes a predetermined distance (for example, 60 m or less), the alarm unit 302 may make the portable terminal 4 terminate the content display. For example, the alarm unit 302 makes the portable terminal 4 terminate the content display, and displays the image G2 decided based on the distance L5. For example, through communication, the alarm unit 302 makes the portable terminal 4 terminate the content display, and displays the image G2 for the start of the steering operation, as the alarm information, on the screen of the portable terminal 4. Here, the size of the image G2 to be displayed at the position P5 is increased relative to the size of the image G2 to be displayed at the position P3 and the position P4.

As described using FIG. 4, the alarm unit 302 can display the alarm information depending on the distance from the vehicle 2 to the termination position for the automatic driving, on the screen of the portable terminal 4. Further, as described in the screen of the portable terminal 4 at the positions P3 to P5, the alarm unit 302 can perform the display on the screen of the portable terminal 4, such that the shorter the distance LX from the vehicle 2 to the termination position F1 for the automatic driving is, the greater the display degree of the image GX is. Therefore, the alarm unit 302 allows the driver focusing attention on the portable terminal 4 to be more easily aware of being in a situation in which the driver must start the manual driving, as the vehicle 2 comes closer to the termination position F1 for the automatic driving. Here, in the case where the portable terminal 4 performs the alarm such as vibration or alarm sound along with the display of the alarm information, the alarm unit 302 may increase the alarm such as vibration or alarm sound, as the distance LX from the vehicle 2 to the termination position F1 for the automatic driving becomes shorter.

Here, in FIG. 4, the example in which the alarm information is displayed on the screen of the portable terminal 4 based on the distance LX from the vehicle 2 to the termination position F1 for the automatic driving has been described, but the arrival time may be employed instead of the distance LX. That is, the alarm unit 302 may calculate the arrival time from the vehicle 2 to the termination position F1 for the automatic driving, using the distance LX and the vehicle speed, and may display the images G1 to G4 shown in FIG. 3 on the portable terminal 4, depending on the arrival time from the vehicle 2 to the termination time F1 for the automatic driving. Then, the alarm unit 302 may perform the display on the screen of the portable terminal 4, such that the shorter the arrival time from the vehicle 2 to the termination position for the automatic driving is, the greater the display degree of the image GX is.

When the manual driving has been started, the alarm unit 302 may make the portable terminal 4 terminate the display of the alarm information. Whether the manual driving has been started is determined by the manual driving determination unit 303. The detail of the manual driving determination unit 303 will be described later. FIG. 5 is a diagram for describing the termination of the display of the alarm information at the start time of the manual driving. As shown in FIG. 5, at time T6, the vehicle 2 is at a position P6. Then, suppose that the driver starts the manual driving at the position P6. In this case, the alarm unit 302 terminates the display of the image G2 that is the displayed alarm information. Therefore, the alarm unit 302 can terminate the display of the alarm information that is unnecessary for the driver having started the manual driving. Here, in the case where the alarm unit 302 performs other alarms such as vibration and alarm sound simultaneously, the alarm unit 302 may terminate the alarms also. Further, in the case where the alarm unit 302 has terminated the display of the content in the portable terminal 4, the alarm unit 302 may restart the display of the content in the portable terminal 4. That is, when the manual driving has been started, the alarm unit 302 restores the display on the portable terminal 4 to the state before the display of the alarm information.

Alternatively, the alarm unit 302 may display an operation button for giving the instruction of the alarm termination to the portable terminal 4, and may make the portable terminal 4 terminate the display of the alarm information when the operation button is operated. In this case, it is possible to avoid continuing the unnecessary alarm to the driver who has given the instruction of the alarm termination consciously.

Meanwhile, when the manual driving is not started in the case where the distance from the vehicle 2 to the termination position F1 for the automatic driving is a termination threshold or less, the alarm unit 302 may display an image for giving notice of the termination of the automatic driving, on the screen of the portable terminal 4. The termination threshold is a threshold for determining whether to make the portable terminal 4 terminate the display of the image G2, and is a previously decided value. The termination threshold, for example, can be set in a range of 50 m or less (several seconds or less in terms of second). When the driver does not return to the driving at the termination threshold or less, there are a possibility that the driver does not pay attention to the portable terminal 4, a possibility that the awakening degree of the driver is low, and the like. Therefore, the display of the alarm information on the screen of the portable terminal 4 is terminated, and the notice of the termination of the automatic driving is given. The alarm unit 302 may notify the driver of the future situation of the vehicle, along with the termination of the automatic driving. The automatic driving ECU 20 may perform a process such as the stop of the vehicle 2.

Figure 6:
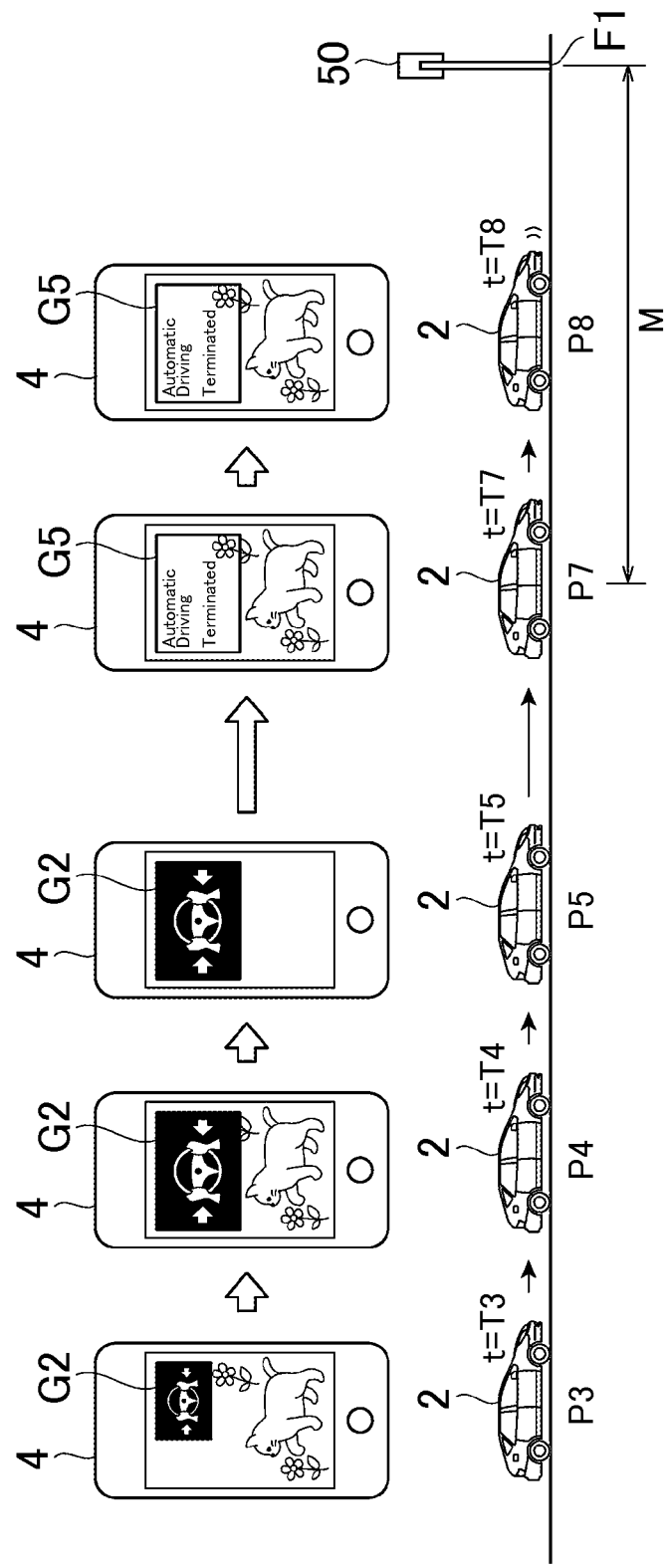
FIG. 6 is a diagram for describing the termination of the display of the alarm information when the manual driving is not started.

FIG. 6 is a diagram for describing the termination of the display of the alarm information when the manual driving is not started. As shown in FIG. 6, at time T7, the vehicle 2 is at a position P7. Then, suppose that the driver does not start the manual driving even at the position P7. Furthermore, a distance L7 from the position P7 to the termination position F1 for the automatic driving is a previously set termination threshold M or less. In this case, the alarm unit 302 makes the portable terminal 4 terminate the display of the image G2. Then, the alarm unit 302 displays an image G5 for giving notice of the termination of the automatic driving, on the screen of the portable terminal 4. Here, at time T8, the automatic driving ECU 20 may perform the emergency stop of the vehicle 2 at a road shoulder or the like around a position P8 just before the termination position F1 for the automatic driving. Alternatively, instead of the image G5 for giving notice of the termination of the automatic driving, the alarm unit 302 may display the remainder information including characters such as "drive carefully", on the screen of the portable terminal 4. Further, it is allowable that the display of the content in the portable terminal 4 is not restarted for a predetermined period.

Figure 7:
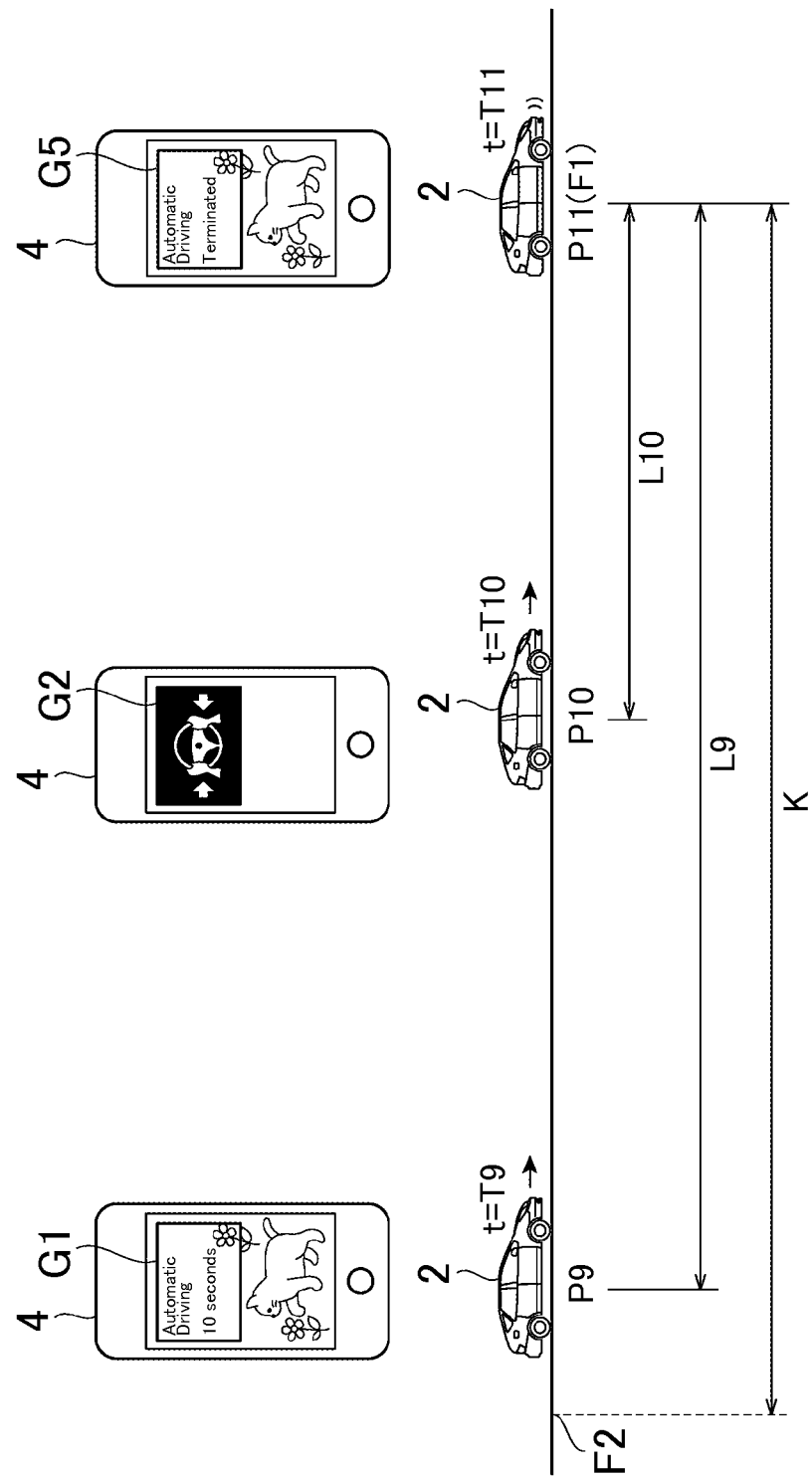
FIG. 7 is a diagram for describing a relation between the distance from the vehicle to the termination position for the automatic driving and the alarm information to be displayed on the screen of the portable terminal.

In FIGS. 4 to 6, the case where the termination position F1 for the automatic driving is the expressway exit 50, that is, the case where the termination position F1 for the automatic driving is decided based on the position information about the vehicle 2 and the map information has been described, but, the termination position F1 for the automatic driving may be decided based on the surrounding environment information about the vehicle 2. FIG. 7 is a diagram for describing a relation between the distance LX from the vehicle 2 to the termination position F1 for the automatic driving and the alarm information to be displayed on the screen of the portable terminal 4. In FIG. 7, the alarm unit 302 displays the alarm information on the screen of the portable terminal 4, on the basis of the termination position F1 for the automatic driving decided based on the surrounding environment information about the vehicle 2. In FIG. 7, it is assumed that the vehicle 2, at time T9, is at a position P9, and detects at time T9 that a white line at a position P11 in front of the vehicle 2 is blurred. That is, FIG. 7 shows the relation between the distance LX (X is an integer) from the current position PX (X is an integer) of the vehicle 2 to the termination position F1 for the automatic driving and the alarm information (the images G1 to G2) to be displayed on the screen of the portable terminal 4. In FIG. 7, similarly to FIG. 4, it is assumed that the driver is viewing a content such as a moving image in the portable terminal 4. Time t at each position PX is expressed as TX (X is an integer). Further, the position F2 the predetermined distance K (predetermined value) away from the termination position F1 for the automatic driving is behind the position P9. The distance K is a distance that is previously set for determining whether to perform the alarm for the start of the manual driving.

In the case of time T9, the vehicle 2 is at the position P9. A distance L9 from the position P9 to the termination position F1 for the automatic driving is equal to or less than the distance K from the position F2 to the termination position F1 for the automatic driving. Therefore, the alarm unit 302 displays the image G1 as the alarm information on the screen of the portable terminal 4, through communication. Here, the alarm unit 302 displays the image G1 decided based on the distance L9 such that the image G1 is superimposed on the content. In the image G1, the time (here, 10 seconds) before the automatic driving termination is displayed.

At time T10, the vehicle 2 is at a position P10. A distance L10 from the position P10 to the termination position F1 for the automatic driving is the distance K or less. Therefore, the alarm unit 302 continuously displays the alarm information on the screen of the portable terminal 4. The alarm unit 302 displays the image G2 decided based on the distance L10 such that the image G2 is superimposed on the content. The alarm unit 302 not only can alter the type of the image based on the distance L10, but also can alter the size of the image based on the distance L10. Here, through communication, the alarm unit 302 makes the portable terminal 4 display the image G2 for the start of the steering operation, as the alarm information.

The termination of the display of the alarm information is the same as that in the case described in FIGS. 5 and 6. That is, the alarm unit 302 may make the portable terminal 4 terminate the display of the alarm information when the manual driving is started, and may display the image for giving notice of the termination of the automatic driving, on the screen of the portable terminal 4, when the manual driving is not started in the case where the distance from the vehicle 2 to the termination position F1 for the automatic driving is a predetermined distance or less. FIG. 7 shows an example of the termination of the display of the alarm information when the manual driving is not started. At time T11, the vehicle 2 is at the position P11. Then, suppose that the driver does not start the manual driving even at the position P11. In this case, the alarm unit 302 makes the portable terminal 4 terminate the display of the image G2. Then, the alarm unit 302 displays the image G5 for giving notice of the termination of the automatic driving, on the screen of the portable terminal 4. Here, the automatic driving ECU 20 may perform the emergency stop of the vehicle 2 at time T11.

As described above, even when the termination position F1 for the automatic driving is decided based on the surrounding environment information about the vehicle 2, the alarm unit 302 can make the portable terminal 4 display the images G1 to G4 shown in FIG. 3, depending on the distance LX from the vehicle 2 to the termination position F1 for the automatic driving. Here, the arrival time from the vehicle 2 to the termination position F1 for the automatic driving may be calculated using the distance LX and the vehicle speed, and the images G1 to G4 shown in FIG. 3 may be displayed on the portable terminal 4, depending on the arrival time from the vehicle 2 to the termination position F1 for the automatic driving. Further, in the case where the termination position F1 for the automatic driving is decided based on the surrounding environment information about the vehicle 2, the current position of the vehicle 2 can be the termination position for the automatic driving, depending on the determination result. In this case, the portable terminal 4 may continue displaying the images G1 to G4 shown in FIG. 3. Here, it is only necessary to display either one of the images G2 to G4.

Next, the detail of the manual driving determination unit 303 will be described. The manual driving determination unit 303 determines whether the driver has started the manual driving. The manual driving determination unit 303 may determine that the driver has started the manual driving, for example, using the operation information in the portable terminal 4 acquired by the communication unit 21, the stepping quantity of the accelerator pedal detected by the accelerator pedal sensor 25, the stepping quantity of the brake pedal detected by the brake pedal sensor 26, the steering torque detected by the steering sensor 27, the pressure detected by the steering wheel touch sensor 28, the image picked up by the driver monitoring camera 29, or the information of a combination of them.

Specifically, the manual driving determination unit 303 may determine that the driver has started the manual driving, when it can be determined that the operation of the portable terminal 4 has been terminated, from the operation information accepted by the portable terminal 4. Alternatively, the manual driving determination unit 303 may determine that the driver has started the manual driving, when the stepping quantity of the accelerator pedal is a predetermined value or more. Alternatively, the manual driving determination unit 303 may determine that the driver has started the manual driving, when the stepping quantity of the brake pedal is a predetermined value or more. Alternatively, the manual driving determination unit 303 may determine that the driver has started the manual driving, when the steering torque is a predetermined value or more. Alternatively, the manual driving determination unit 303 may determine that the driver has started the manual driving, when the pressure at the time of steering wheel touch is a predetermined value or more. Alternatively, the manual driving determination unit 303 may determine that the driver has started the manual driving, when it can be determined that the driver is holding the steering wheel and is facing in the forward direction of the vehicle 2, from the imaging information about the driver.

Alternatively, the manual driving determination unit 303 may compare a normative driving operation computed based on the surrounding environment information about the vehicle 2 and a driving operation by the driver, and may determine whether the manual driving has been started, based on the comparison result. The normative driving operation is an operation that the driver should perform in a running situation, or an operation that the driver is likely to perform in the running situation. For example, the normative driving operation includes a steering operation in a range in which the vehicle 2 runs along a road, a brake operation just before a sharp curve, a steering operation in the direction of a curve, a steering operation in a necessary direction in a situation requiring a lane change due to a branch, a junction, a lane disappearance or the like, or in an obstacle avoidance situation, a brake operation (or a downshift operation) just before a construction place, a traffic congestion place or an expressway exit, and the like. The manual driving determination unit 303 recognizes a running situation in front of the vehicle at a spot where the driver starts the manual driving, based on the surrounding environment information about the vehicle 2, and computes the normative driving operation.

Then, the manual driving determination unit 303, for example, acquires the driving operation by the driver with the various sensors, compares the normative driving operation and the driving operation by the driver, and determines whether the manual driving has been started, based on the comparison result. For example, when the steering operation by the driver is a steering operation in a range in which the vehicle 2 runs along the road, the manual driving determination unit 303 determines that the manual driving has been started. Further, the driving operation such as the steering operation, the brake pedal operation or the accelerator pedal operation has an operation direction. Therefore, the manual driving determination unit 303 may determine that the manual driving has been started, when the operation direction of the driving operation by the driver coincides with the operation direction of the normative driving operation.

Figure 8:
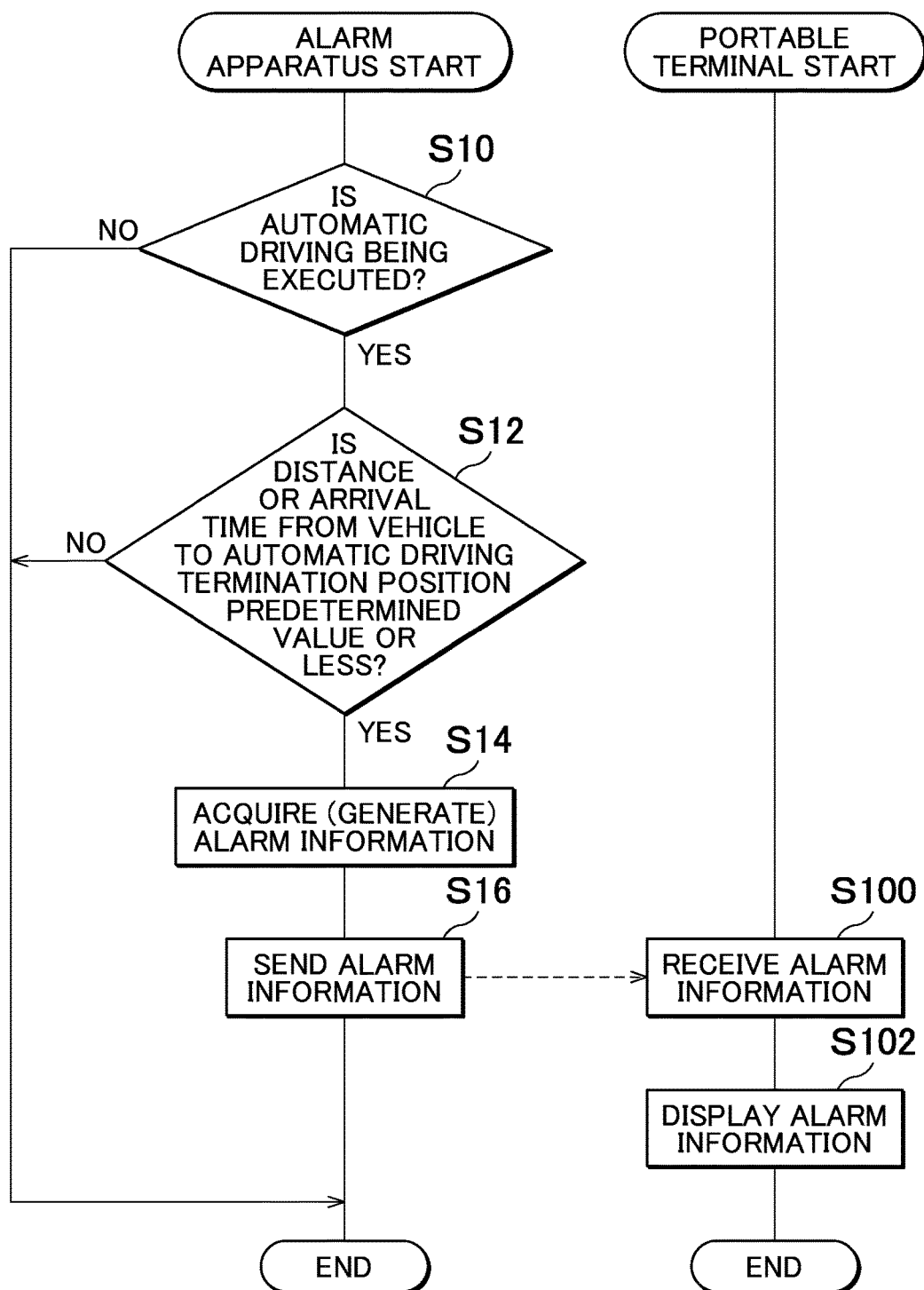
FIG. 8 is a flowchart for describing an alarm process in the alarm system according to the first embodiment.

Next, an alarm process in the alarm system 1 will be described. FIG. 8 is a flowchart for describing an alarm process in the alarm system according to the first embodiment. In FIG. 8, it is assumed to be in a state in which the communication unit 21 of the vehicle 2 and the communication unit 40 of the portable terminal 4 can communicate with each other.

As shown in FIG. 8, the automatic driving determination unit 300 of the alarm ECU 30 performs the automatic driving determination, as step S10. The automatic driving determination unit 300 determines whether the vehicle 2 is in the execution of the automatic driving, for example, based on the flag information output by the automatic driving ECU 20. In the case where the flag information is "0", the automatic driving determination unit 300 determines that the automatic driving is not being executed. In this case, the alarm ECU 30 terminates the process shown in FIG. 8. On the other hand, in the case where the flag information is "1", the automatic driving determination unit 300 determines that the automatic driving is being executed. In this case, the alarm ECU 30 performs an alarm necessity determination process (step S12).

The alarm necessity determination unit 301 of the alarm ECU 30 performs the alarm necessity determination, as step S12. The alarm necessity determination unit 301 determines whether the distance or arrival time from the vehicle 2 to the termination position for the automatic driving is the predetermined value or less. In the following, a case where the determination is made using the distance LX from the vehicle 2 to the termination position F1 for the automatic driving as shown in FIG. 4 will be described as an example. Further, here, as an example, the predetermined value is set to 1 km. The alarm necessity determination unit 301 derives the current position PX of the vehicle 2 and the termination position F1 for the automatic driving of the vehicle 2, based on the position information about the vehicle 2 and the map information, or based on the surrounding environment information. Here, suppose that the current position of the vehicle 2 is P3. Then, the alarm necessity determination unit 301 calculates the distance L3 from the vehicle 2 to the termination position F1 for the automatic driving. Then, the alarm necessity determination unit 301 compares the distance L3 and the predetermined value, and outputs the determination result. For example, if the distance L3 is 1.5 km, the alarm necessity determination unit 301 determines that the distance 1.5 km from the vehicle 2 to the termination position F1 for the automatic driving is greater than the predetermined value 1 km. Then, the process shown in FIG. 8 is terminated. On the other hand, for example, if the distance L3 is 0.8 km, the alarm necessity determination unit 301 determines that the distance 0.8 km from the vehicle 2 to the termination position F1 for the automatic driving is the predetermined value 1 km or less. In this case, the alarm ECU 30 performs a generation process for the alarm information (step S14).

The alarm unit 302 of the alarm ECU 30 performs the generation or acquisition of the alarm information, as step S14. The alarm unit 302, for example, predicts a driving operation necessary for the driver, based on the current position of the vehicle 2 or the road form in front of the vehicle 2, and generates the alarm information corresponding to the necessary driving operation. When the vehicle 2 is sufficiently close to the termination position for the automatic driving, the alarm unit 302 may predict a driving operation necessary for the driver, based on the road form at the termination position for the automatic driving, and may generate the alarm information corresponding to the necessary driving operation. Alternatively, the alarm unit 302, for example, refers to the alarm information stored in the referable storage device, and acquires the alarm information corresponding to the necessary driving operation. Here, suppose that the alarm information that the steering operation is necessary is acquired. In this case, the alarm unit 302 acquires the image G2 prompting the steering operation, as shown in FIG. 3B. Then, the alarm ECU 30 sends the alarm information (step S16).

The alarm unit 302 of the alarm ECU 30 sends the alarm information to the portable terminal 4, as step S16. The alarm unit 302, for example, sends the image G2 generated or acquired in step S14, to the portable terminal 4 through the communication unit 21. Then, the alarm ECU 30 terminates the process shown in FIG. 8.

The communication unit 40 of the portable terminal 4 receives the alarm information, as step S100. The communication unit 40, for example, receives the image G2 sent in step S16. Then, the portable terminal 4, once receiving the alarm information, displays the alarm information on the display unit 41, as step S102. The portable terminal 4, for example, displays the image G2 received in step S100. The portable terminal 4, for example, displays the image G2 such that the image G2 is superimposed on a displayed content. Thereby, at the position P3, the image G2 as the alarm information is displayed on the screen of the portable terminal 4. The portable terminal 4, once displaying the alarm information, terminates the process shown in FIG. 8.

Here, in FIG. 8, the case where the necessity of the alarm is determined by the distance from the vehicle 2 to the termination position for the automatic driving has been described as an example, but the necessity of the alarm may be determined by the arrival time from the vehicle 2 to the termination position for the automatic driving.

Thus, in the alarm ECU 30, when the alarm necessity determination unit 301 determines that the distance LX or arrival time to the termination position F1 for the automatic driving is the predetermined distance K or less, the alarm unit 302 displays the image GX for having the driver start the manual driving, on the screen of the portable terminal 4. Therefore, the alarm ECU 30 allows the driver focusing attention on the portable terminal 4 to be easily aware of being in a situation in which the driver must start the manual driving, compared to the case where the image GX is displayed on only the display secured to the dashboard, or the like.

Figure 9:
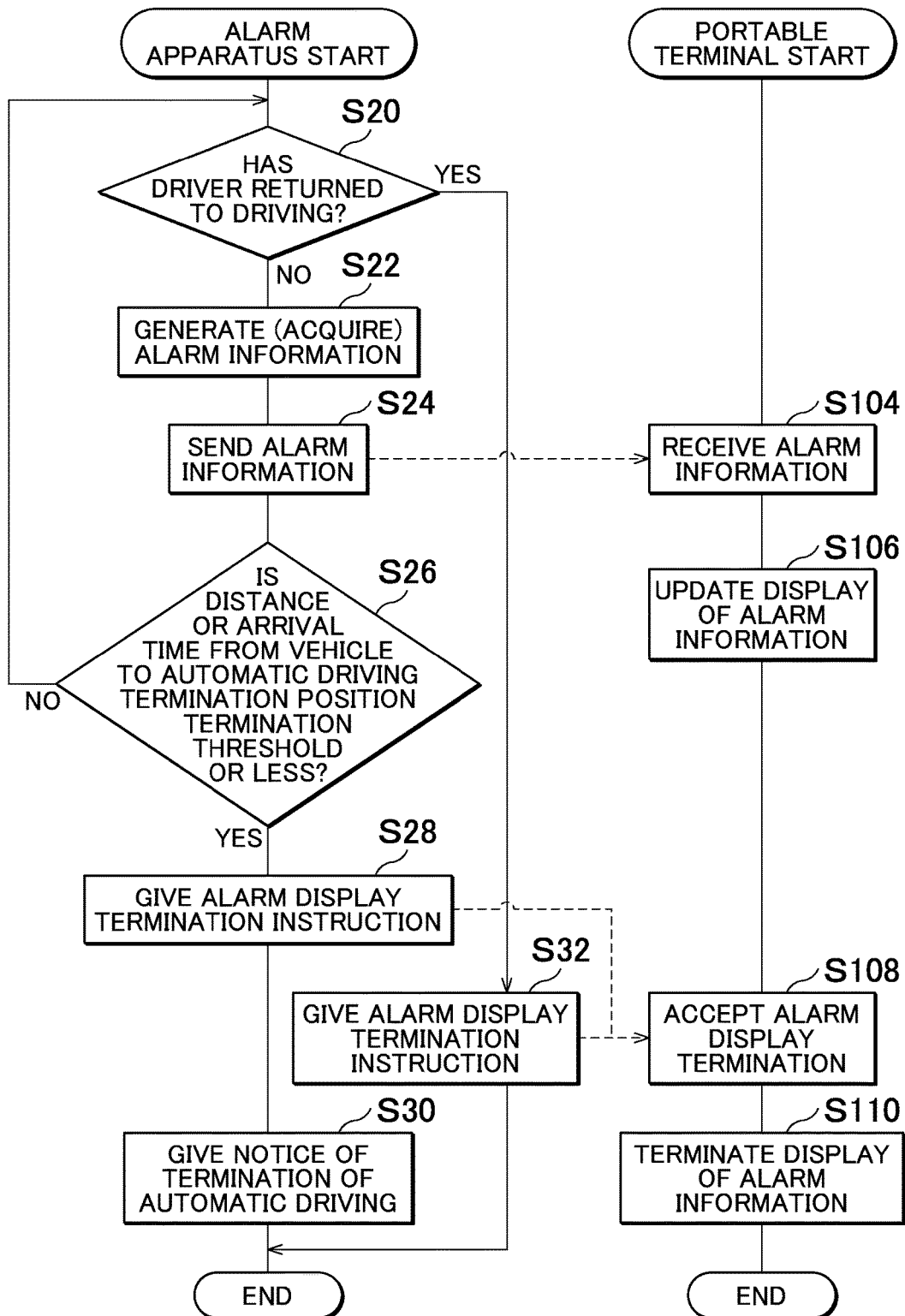
FIG. 9 is a flowchart for describing the alarm process in the alarm system according to the first embodiment.

Next, a process of updating the display of the alarm information by the alarm system 1, and a process of terminating the display of the alarm information will be described. FIG. 9 is a flowchart for describing the alarm process in the alarm system according to the first embodiment. In FIG. 9, it is assumed that the process of FIG. 8 is completed and the alarm information is displayed on the screen of the portable terminal 4. Here, a case where the image G2 as the alarm information is displayed on the screen of the portable terminal 4 at the position P3 shown in FIG. 4 to FIG. 7 will be described as an example.

The manual driving determination unit 303 of the alarm ECU 30 determines whether the driver has returned to the driving, as step S20. That is, the manual driving determination unit 303 determines whether the driver has started the manual driving, as step S20. For example, suppose that the driver holds the steering at the position P6 shown in FIG. 5. In this case, when the pressure detected by the steering wheel touch sensor 28 is less than the predetermined value, the manual driving determination unit 303 determines that the driver has not started the manual driving. Alternatively, the manual driving determination unit 303 recognizes the running situation in front of the vehicle 2, based on the surrounding environment information about the vehicle 2, and computes the normative driving operation. Here, suppose that the road in front of the vehicle 2 is a curve. In this case, the manual driving determination unit 303 recognizes the form of the curve based on the surrounding environment information about the vehicle 2, and computes a normative steering operation corresponding to the form of the curve. Then, the manual driving determination unit 303 acquires a steering operation that the driver is actually performing, based on the detection result by the steering sensor 27. Then, the manual driving determination unit 303 compares the normative steering operation and the steering operation that the driver is actually performing, and determines whether the manual driving has been started, based on the comparison result. The manual driving determination unit 303, for example, determines whether the operation direction of the normative steering operation and the operation direction of the steering operation by the driver are the same. In the case of being not the same, the manual driving determination unit 303 determines that the driver has not started the manual driving.

When the manual driving determination unit 303 determines that the driver has not started the manual driving, the alarm ECU 30 performs the generation process for the alarm information (step S22).

The alarm unit 302 of the alarm ECU 30 performs the generation or acquisition of the alarm information, as step S22. In step S22, the alarm information has already been displayed on the screen of the portable terminal 4, and therefore, the alarm unit 302 performs the generation or acquisition of the alarm information for update. The alarm unit 302 generates the alarm information, similarly to step S14. Here, suppose that the alarm unit 302 generates the image for the steering operation in step S14. For example, suppose that the image G2 for the steering operation is generated at the position P3 in FIG. 4 and is displayed on the screen of the portable terminal 4. Furthermore, suppose that the vehicle 2 has moved from the position P3 to the position P4. The alarm unit 302 alters the size of the image G2, based on the distance L4 from the vehicle 2 to the termination position F1 for the automatic driving. For example, the alarm unit 302 acquires, from the storage device, the image G2 whose size is greater as the distance LX becomes shorter. Alternatively, the alarm unit 302 may generate the image G2, using a coefficient that increases the size of the image as the distance LX becomes shorter. Thus, as the image to be displayed at the position P4, the alarm unit 302 generates or acquires the image G2 that is greater than the image G2 displayed at the position P3. Then, the alarm ECU 30 sends the alarm information (step S24).

The alarm unit 302 of the alarm ECU 30 sends the alarm information to the portable terminal 4, as step S24. For example, through the communication unit 21, the alarm unit 302 sends the image G2 generated or acquired in step S22, to the portable terminal 4. The communication unit 40 of the portable terminal 4 receives the alarm information, as step S104. The communication unit 40, for example, receives the image G2 sent in step S24. Then, the portable terminal 4, once receiving the alarm information, displays the alarm information on the display unit 41, as step S106. The portable terminal 4, for example, displays the image G2 received in step S104. The portable terminal 4, for example, displays the image G2 such that the image G2 is superimposed on the displayed content. Thereby, as shown in FIG. 4, at the position P4, the image G2 that is greater than the image G2 displayed at the position P3 is displayed on the screen of the portable terminal 4. Thus, the alarm unit 302 alters the display degree of the alarm information to be displayed on the portable terminal 4.

Next, the alarm unit 302 of the alarm ECU 30 performs the termination determination for the alarm information, as step S26. The alarm unit 302 determines whether the distance or arrival time from the vehicle 2 to the termination position for the automatic driving is the termination threshold or less. When the alarm unit 302 determines that the distance or arrival time from the vehicle 2 to the termination position for the automatic driving is greater than the termination threshold, the alarm ECU 30 returns to step S20. Then, the manual driving determination unit 303 determines whether the driver has returned to the driving. When the driver has not returned to the driving, the alarm ECU 30 executes step S22 to step S26. In the case where the distance or arrival time from the vehicle 2 to the termination position for the automatic driving is greater than the termination threshold and where the driver has not returned to the driving in this way, the alarm unit 302 increases and updates the display degree of the alarm information, sends the updated alarm information to the portable terminal 4, and then displays the alarm information on the display unit 41 of the portable terminal 4. Thereby, as shown in the position P3 to the position P5 of FIG. 4, on the display unit 41 of the portable terminal 4, the display degree of the alarm information becomes greater as the vehicle 2 comes closer to the termination position F1 for the automatic driving.

When the distance or arrival time from the vehicle 2 to the termination position F1 for the automatic driving is the termination threshold or less, the alarm unit 302 performs the process of the alarm display termination instruction (step S28). The alarm ECU 30 sends the instruction to terminate the alarm display, to the portable terminal 4, as step S28. The portable terminal 4 receives the instruction of the alarm display termination, as step S108. Then, the portable terminal 4 terminates the display of the alarm information displayed on the display unit 41, as step S110. Thereby, the display of the image G2 displayed on the display unit 41 of the portable terminal 4 disappears, as shown in the position P6 of FIG. 5, for example.

Then, the alarm unit 302 notifies the driver of the termination of the automatic driving, as step S30. As shown in the position P7 of FIG. 6, for example, the alarm unit 302 displays the image G5 for the notice of the termination of the automatic driving, on the screen of the portable terminal 4. Then, the alarm ECU 30 terminates the process shown in FIG. 8.

On the other hand, when the manual driving determination unit 303 determines that the driver has started the manual driving, the alarm ECU 30 performs the process of the alarm display termination instruction (step S32). The alarm ECU 30 sends the instruction to terminate the alarm display, to the portable terminal 4, as step S32. The portable terminal 4 receives the instruction of the alarm display termination, as step S108. Then, the portable terminal 4 terminates the display of the alarm information displayed on the display unit 41, as step S110. Thereby, the display of the image G2 displayed on the display unit 41 of the portable terminal 4 disappears, as shown in the position P6 of FIG. 5, for example.

Thus, the alarm ECU 30 terminates the process shown in FIG. 9. By the execution of the process shown in FIG. 9, the display of the alarm information becomes greater as the vehicle 2 comes closer to the termination position F1 for the automatic driving. Therefore, the alarm ECU 30 according to the embodiment allows the driver focusing attention on the portable terminal 4 to be more easily aware of being in a situation in which the driver must start the manual driving, as the vehicle 2 comes closer to the termination position F1 for the automatic driving.

Further, the alarm unit 302 according to the embodiment terminates the display of the alarm information on the portable terminal 4, when the manual driving determination unit 303 determines that the driver has started the manual driving, and therefore, it is possible to terminate the display of the alarm information that is unnecessary for the driver having started the manual driving.

Further, the manual driving determination unit 303 compares the normative driving operation computed based on the surrounding environment information about the vehicle 2 and the driving operation by the driver, and determines whether the manual driving has been started, based on the comparison result. Therefore, the alarm ECU 30 according to the embodiment can determine that the manual driving is adequately being performed by the driver, in the light of the normative driving operation, and therefore, it is possible to avoid, for example, by a wrong operation, determining that the driver has started the manual driving, and terminating the display of the alarm information.

[Second Embodiment]

Next, an alarm system 1A according to a second embodiment will be described. The alarm system 1A according to the second embodiment is different from the alarm system 1 according to the first embodiment, in that the functions of the alarm ECU 30 of the vehicle 2 are provided in a portable terminal 4A side.

Figure 10:
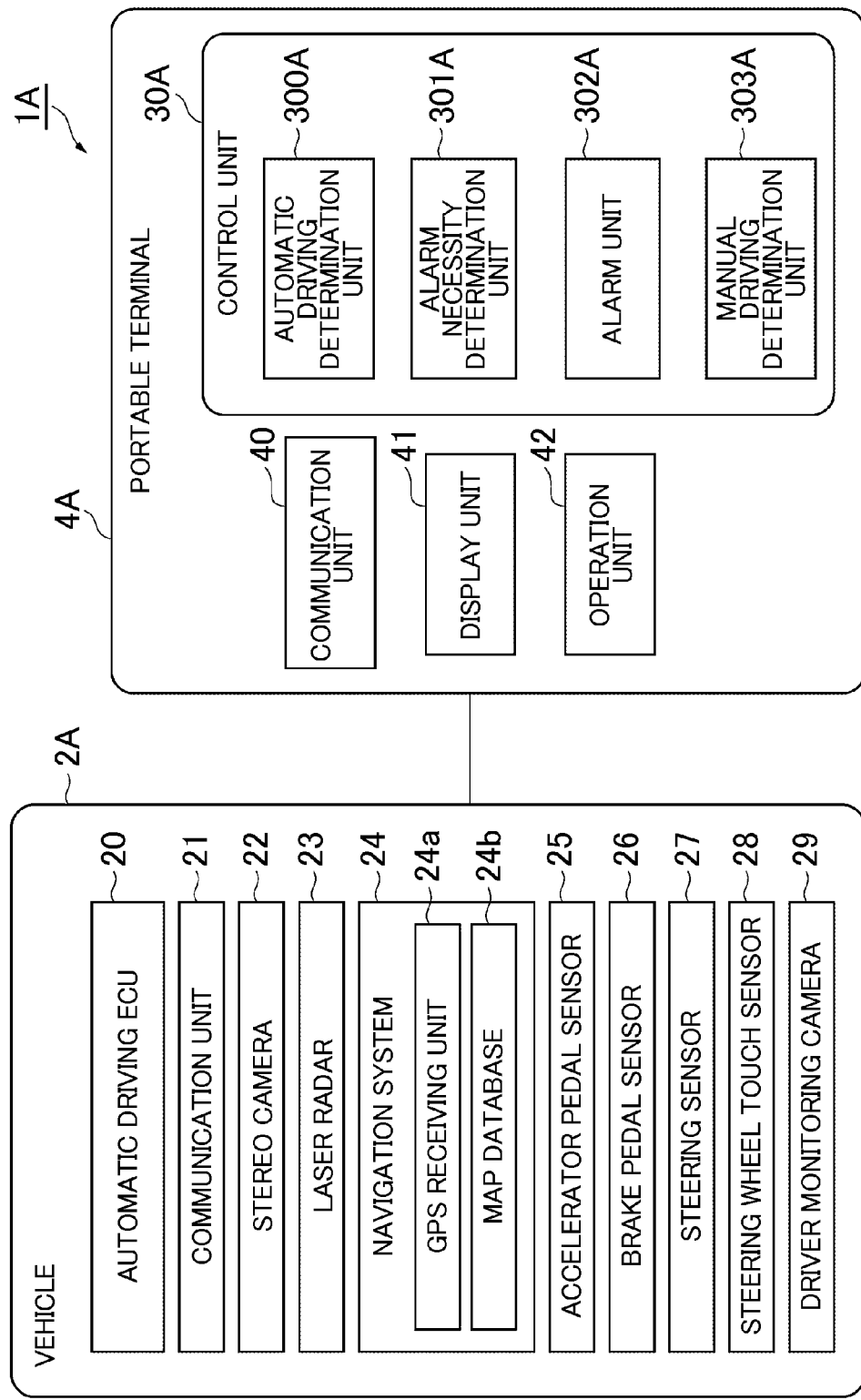
FIG. 10 is a block diagram showing a configuration of an alarm system according to a second embodiment.

First, a configuration of the alarm system 1A according to the second embodiment will be described. FIG. 10 is a block diagram showing the configuration of the alarm system 1A according to the second embodiment. As shown in FIG. 10, a vehicle 2A has a configuration in which the alarm ECU 30 is excluded from the configuration of the vehicle 2 described in the first embodiment. Further, a portable terminal 4A has a configuration in which a control unit 30A corresponding to the alarm ECU 30 is added to the configuration of the portable terminal 4 described in the first embodiment.

The control unit 30A includes an automatic driving determination unit 300A, an alarm necessity determination unit (determination unit) 301A, an alarm unit (alarm unit) 302A, and a manual driving determination unit 303A.

The automatic driving determination unit 300A determines whether the vehicle 2A is in the execution of the automatic driving. Specifically, the automatic driving determination unit 300A acquires the information allowing for the identification of whether the automatic driving is being executed, from the vehicle 2A through the communication unit 40. The other functions are the same as those of the automatic driving determination unit 300 described in the first embodiment. The automatic driving determination unit 300A outputs the determination result to the alarm necessity determination unit 301A.

The alarm necessity determination unit 301A determines the necessity of the alarm, during the automatic driving of the vehicle 2A. The alarm necessity determination unit 301A acquires the information to be used for the determination, from the vehicle 2A through the communication unit 40. The other functions are the same as those of the alarm necessity determination unit 301 determined in the first embodiment.

The alarm unit 302A displays the alarm information for having the driver start the manual driving, on the display unit 41 (screen) of the portable terminal 4A, when the alarm necessity determination unit 301A determines that the distance or arrival time to the termination position for the automatic driving is the predetermined value or less. The alarm unit 302A may acquire the alarm information from the vehicle 2A, or may acquire the alarm information from another storage device. The other functions are the same as those of the alarm unit 302 described in the first embodiment.

The manual driving determination unit 303A determines whether the driver has started the manual driving. The manual driving determination unit 303A acquires the information to be used for the determination, from the vehicle 2A through the communication unit 40. The other functions are the same as those of the manual driving determination unit 303 described in the first embodiment.

Figure 11:
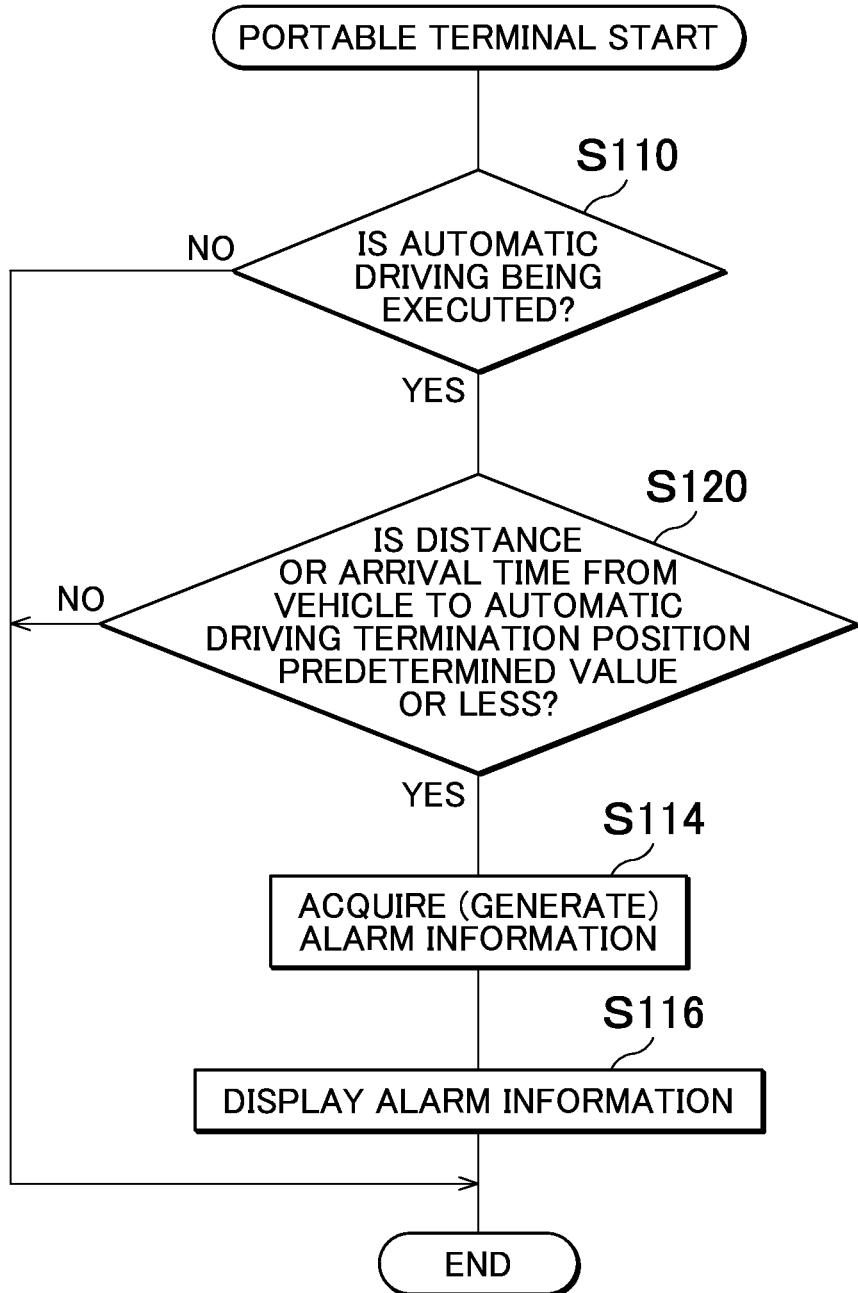
FIG. 11 is a flowchart for describing an alarm process in the alarm system according to the second embodiment.

Next, an alarm process in the alarm system 1A will be described. FIG. 11 is a flowchart for describing the alarm process in the alarm system 1A according to the second embodiment. In FIG. 11, it is assumed to be in a state in which the communication unit 21 of the vehicle 2A and the communication unit 40 of the portable terminal 4A can communicate with each other.

As shown in FIG. 11, the automatic driving determination unit 300A of the portable terminal 4A performs the automatic driving determination, as step S110. The automatic driving determination unit 300A, for example, acquires the flag information output by the automatic driving ECU 20, from the vehicle 2A, and determines whether the vehicle 2A is in the execution of the automatic driving. The determination method is the same as that in step S10. When the automatic driving determination unit 300A determines that the automatic driving is not being executed, the control unit 30A terminates the process shown in FIG. 11. On the other hand, when the automatic driving determination unit 300A determines that the automatic driving is being executed, the control unit 30A performs the alarm necessity determination process (step S112).

The alarm necessity determination unit 301A of the control unit 30A performs the alarm necessity determination, as step S112. The alarm necessity determination unit 301A acquires the information from the vehicle 2A through the communication unit 40, and determines whether the distance or arrival time from the vehicle 2A to the termination position for the automatic driving is the predetermined value or less. The determination method is the same as that in step S12. When the alarm necessity determination unit 301A determines that the distance from the vehicle 2A to the termination position F1 for the automatic driving is greater than the predetermined value, the control unit 30A terminates the process shown in FIG. 11. On the other hand, when the alarm necessity determination unit 301A determines that the distance from the vehicle 2A to the termination position F1 for the automatic driving is the predetermined value or less, the control unit 30A performs the generation process for the alarm information (step S114).

The alarm unit 302A of the control unit 30A performs the generation or acquisition of the alarm information, as step S114. The generation method or the acquisition method is the same as that in the step S14. Then, the control unit 30A performs the display of the alarm information (step S116).

The alarm unit 302A of the control unit 30A displays the alarm information on the display unit 41, as step S116. The portable terminal 4A, once displaying the alarm information, terminates the process shown in FIG. 11.

Thus, in the control unit 30A, when the alarm necessity determination unit 301A determines that the distance or arrival time to the termination position for the automatic driving is the predetermined value or less, the alarm unit 302A displays the image for having the driver start the manual driving, on the screen of the portable terminal 4A of the driver. Therefore, the control unit 30A allows the driver focusing attention on the portable terminal 4A to be easily aware of being in a situation in which the driver must start the manual driving, compared to the case where the alarm information is displayed on only the display secured to the dashboard, or the like.

Figure 12:
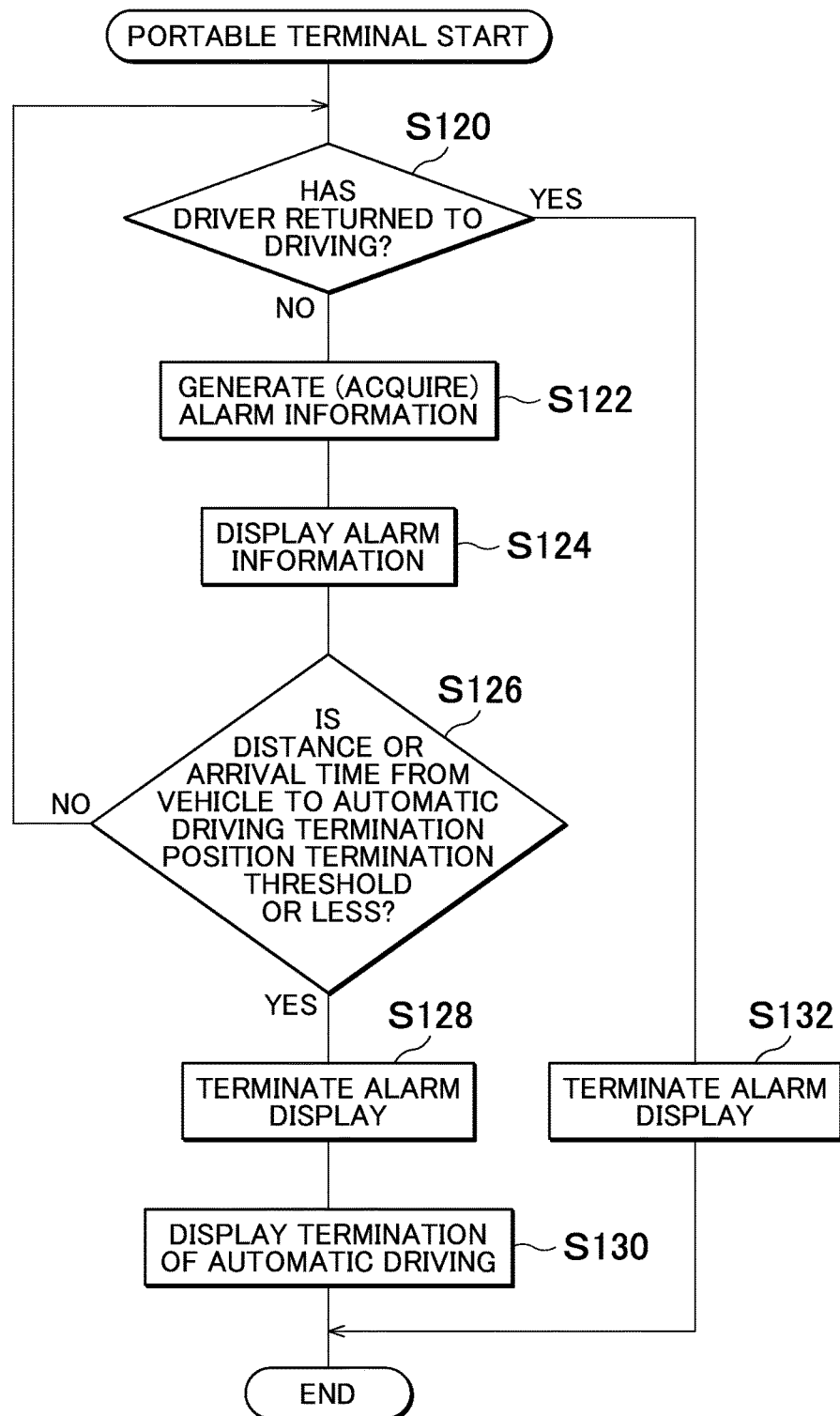
FIG. 12 is a flowchart for describing the alarm process in the alarm system according to the second embodiment.

Next, a process of updating the display of the alarm information by the alarm system 1A, and a process of terminating the display of the alarm information will be described. FIG. 12 is a flowchart for describing the alarm process in the alarm system 1A according to the second embodiment. In FIG. 12, it is assumed that the process of FIG. 11 is completed and the alarm information is displayed on the screen of the portable terminal 4A. Here, a case where the image G2 as the alarm information is displayed on the screen of the portable terminal 4A at the position P3 shown in FIG. 4 to FIG. 7 will be described as an example.

The manual driving determination unit 303A of the control unit 30A determines whether the driver has returned to the driving, as step S120. The manual driving determination unit 303A acquires the information from the vehicle 2A through the communication unit 40, and determines whether the driver has started the manual driving. The determination method is the same as that in the step S20. When the manual driving determination unit 303A determines that the driver has not started the manual driving, the control unit 30A performs the generation process for the alarm information (step S122).

The alarm unit 302A of the control unit 30A performs the generation or acquisition of the alarm information, as step S122. In step S122, the alarm information has already been displayed on the screen of the portable terminal 4A, and therefore, the alarm unit 302A performs the generation or acquisition of the alarm information for update. The generation or acquisition of the alarm information is the same as that in step S22. Then, the control unit 30A performs the display of the alarm information (step S124).

The alarm unit 302A of the control unit 30A displays the alarm information on the display unit 41 of the portable terminal 4A, as step S124. The portable terminal 4A, for example, displays the image as the alarm information such that the image is superimposed on the displayed content.

Next, the alarm unit 302A of the control unit 30A performs the termination determination for the display of the alarm information, as step S126. The alarm unit 302A acquires the information from the vehicle 2A through the communication unit 40, and determines whether the distance or arrival time from the vehicle 2A to the termination position for the automatic driving is the termination threshold or less. When the alarm unit 302A determines that the distance or arrival time from the vehicle 2A to the termination position for the automatic driving is greater than the termination threshold, the control unit 30A returns to step S120. Then, the manual driving determination unit 303A determines whether the driver has returned to the driving. When the driver has not returned to the driving, the control unit 30A executes step S122 to step S126. In the case where the distance or arrival time from the vehicle 2A to the termination position for the automatic driving is greater than the termination threshold and where the driver has not returned to the driving in this way, the alarm unit 302A increases and updates the display degree of the alarm information, and then displays the alarm information on the display unit 41 of the portable terminal 4A.

When the distance or arrival time from the vehicle 2A to the termination position for the automatic driving is the termination threshold or less, the alarm unit 302A terminates the display of the alarm information, as step S128. Then, the alarm unit 302A notifies the driver of the termination of the automatic driving, as step S130. Then, the control unit 30A terminates the process shown in FIG. 12.

On the other hand, when the manual driving determination unit 303A determines that the driver has started the manual driving, the control unit 30A terminates the display of the alarm information, as step S132, and terminates the process shown in FIG. 12.

Thus, the control unit 30A terminates the process shown in FIG. 12. By the execution of the process shown in FIG. 12, the display of the alarm information becomes greater as the vehicle 2A comes closer to the termination position for the automatic driving. Therefore, the control unit 30A according to the embodiment allows the driver focusing attention on the portable terminal 4A to be more easily aware of being in a situation in which the driver must start the manual driving, as the vehicle 2A comes closer to the termination position for the automatic driving.

Further, the alarm unit 302A according to the embodiment terminates the display of the alarm information on the portable terminal 4A, when the manual driving determination unit 303A determines that the driver has started the manual driving, and therefore, it is possible to terminate the display of the alarm information that is unnecessary for the driver having started the manual driving.

Further, the manual driving determination unit 303A compares the normative driving operation computed based on the surrounding environment information about the vehicle 2A and the driving operation by the driver, and determines whether the manual driving has been started, based on the comparison result. Therefore, the control unit 30A according to the embodiment can determine that the manual driving is adequately being performed by the driver, in the light of the normative driving operation, and therefore, it is possible to avoid, for example, by a wrong operation, determining that the driver has started the manual driving, and terminating the display of the alarm information.

Thus, each embodiment described above is an embodiment of the alarm system according to the invention, and the alarm system according to the invention is not limited to the contents described in the above respective embodiments.

For example, in the respective embodiments described above, the example in which the display degree of the alarm information is altered using the distance or arrival time to the termination position for the automatic driving has been described, but the alarm system may alter the display degree of the alarm information, further, in consideration of the dangerous extent when the manual driving is not started. For example, the alarm system increases the display degree of the alarm information, when the dangerous extent is great. Thereby, the alarm system allows the driver focusing attention on the portable terminal 4A to be more easily aware of being in a situation in which the driver must start the manual driving, as the dangerous extent in the situation becomes greater.

Further, in the above-described first embodiment, the example in which the alarm ECU 30 includes the automatic driving determination unit 300 and the manual driving determination unit 303 has been described, but the alarm ECU 30 only needs to include at least the alarm necessity determination unit 301 and the alarm unit 302. Similarly, in the above-described second embodiment, the example in which the control unit 30A includes the automatic driving determination unit 300A and the manual driving determination unit 303A has been described, but the control unit 30A only needs to include at least the alarm necessity determination unit 301A and the alarm unit 302A.

Further, in the above-described second embodiment, the case where the portable terminal 4A is configured to be capable of executing all of the functions of the alarm ECU 30 according to the first embodiment has been described, but a case where the portable terminal 4A is configured to be capable of executing some of the functions of the alarm ECU 30 according to the first embodiment may be adopted. That is, in the alarm system according to the invention, it is only necessary that the automatic driving determination unit 300, the alarm necessity determination unit 301, the alarm unit 302 and the manual driving determination unit 303, which have been described in the first embodiment, are included in any one of the vehicle 2 and the portable terminal 4, and the arrangement of the constituent elements is not limiting.

Further, in the respective embodiments described above, the example in which the surrounding environment information about the vehicle acquired by the alarm ECU 30 includes the information (infrastructure information) obtained by the road-vehicle communication has been described, but the position information about the vehicle 2 or the map information may be acquired from the infrastructure information. Furthermore, in the above-described first embodiment, the example in which the alarm information is displayed on the screen of the portable terminal 4 by the communication between the alarm ECU 30 and the portable terminal 4 has been described, but the alarm information may be displayed on the screen of the portable terminal 4 by the communication between an infrastructure apparatus (not illustrated) and the portable terminal 4. In this case, it is only necessary that the automatic driving determination unit 300, the alarm necessity determination unit 301, the alarm unit 302 and the manual driving determination unit 303, which have been described in the first embodiment, are included in any one of the infrastructure apparatus and the portable terminal 4.

Further, in the respective embodiments described above, the example in which the alarm information includes the information relevant to the steering operation, the accelerator operation and the brake operation has been described, but the alarm information may further include the information relevant to a driver confirmation action by which the driver confirms the safety in the periphery. In this case, the alarm apparatus may include an action determination unit that determines whether the driver has started the driver confirmation action. For example, the action determination unit may determine whether the driver has started the driver confirmation action, using the image acquired by the driver monitoring camera 29 that monitors the driver, or the like. Then, when the action determination unit determines that the driver has started the driver confirmation action, the alarm unit may terminate the display of the alarm information on the portable terminal. Even such a configuration allows the driver focusing attention on the portable terminal to be easily aware of being in a situation in which the driver must start the manual driving, and can terminate the alarm when the driver has started the driving.

What is claimed:

1. An alarm apparatus for a vehicle comprising a control unit,
the control unit configured to communicate with a portable terminal, the portable terminal being used at a driver seat by a driver of the vehicle, the vehicle performing automatic driving,
the control unit being configured to determine whether a distance or arrival time from the vehicle to a termination position for the automatic driving is a first predetermined value or less, during the automatic driving, based on position information about the vehicle and map information, or based on surrounding environment information about the vehicle,
the control unit being configured to display first alarm information on a screen of the portable terminal, when it is determined that the distance or arrival time from the vehicle to the termination position for the automatic driving is the first predetermined value or less, the first alarm information prompting the driver to start manual driving, wherein the control unit is configured to display, as the first alarm information, a remaining time in a form of a countdown on the screen of the portable terminal, the remaining time being time remaining until the automatic driving of the vehicle is terminated.

2. The alarm apparatus according to claim 1, wherein
the control unit is configured to predict a driving operation that is necessary at a current position of the vehicle or in front of the vehicle,
the control unit is configured to display an image associated with the predicted necessary driving operation as a second alarm information on the screen of the portable terminal, and
the driving operation corresponds to a steering operation, an accelerator operation or a brake operation.

3. The alarm apparatus according to claim 2, wherein
the control unit configured to display, in response to multiple driving operations being necessary, an image prompting an operation that should be performed first, on the portable terminal.

4. The alarm apparatus according to claim 2, wherein the driving operation is at least one from among a driver holding a steering wheel, the driver pressing an accelerator pedal, and the driver pressing a brake pedal.

5. The alarm apparatus according to claim 1, wherein
the control unit determines whether the driver has started the manual driving, and terminates the display of the alarm information on the portable terminal when it is determined that the driver has started the manual driving.

6. The alarm apparatus according to claim 5, wherein
the control unit compares a normative driving operation and a driving operation by the driver, and determines whether the driver has started the manual driving, based on a comparison result, the normative driving operation being computed based on the surrounding environment information about the vehicle.

7. The alarm apparatus according to claim 1, wherein
the control unit is configured to determine whether the distance or arrival time from the vehicle to the termination position for the automatic driving is a second predetermined value or less, the second predetermined value being less than the first predetermined value, and the control unit is configured to display second alarm information on the screen of the portable terminal, when it is determined that the distance or arrival time from the vehicle to the termination position for the automatic driving is the second predetermined value or less, the second alarm information being different from the first alarm information.

8. The alarm apparatus according to claim 7, wherein
the control unit is configured to display the second alarm information on the screen of the portable terminal such that the shorter the distance or arrival time from the vehicle to the termination position for the automatic driving is, the greater a display degree is.

9. The alarm apparatus according to claim 1, wherein
the portable terminal generates a vibration or an alarm sound in response to the distance or arrival time from the vehicle to the termination position for the automatic driving being a third predetermined value or less, the third predetermined value being less than the first predetermined value.

10. The alarm apparatus according to claim 9, wherein
the shorter the distance or arrival time from the vehicle to the termination position for the automatic driving is, the greater the vibration or alarm sound is increased.

11. The alarm apparatus according to claim 9, wherein
the control unit is configured to determine whether the driver has started the manual driving, and terminates the display of the first alarm information on the portable terminal and the vibration or the alarm sound when it is determined that the driver has started the manual driving.

12. The alarm apparatus according to claim 11, wherein
the control unit compares a normative driving operation and a driving operation by the driver, and determines whether the driver has started the manual driving, based on a comparison result, the normative driving operation being computed based on the surrounding environment information about the vehicle.

13. The alarm apparatus according to claim 1, wherein the control unit is configured to determine whether the driver has started a driver confirmation action by which the driver confirms safety in a periphery, and terminates the display of the first alarm information on the portable terminal when it is determined that the driver has started the driver confirmation action.

14. The alarm apparatus according to claim 1, wherein the control unit is configured to terminate display of the first alarm, in a response to a distance between the vehicle and a termination position being less than a predetermined threshold, and display a notice indicating the automatic driving is complete.

15. The alarm apparatus according to claim 1, wherein the control unit is configured to perform, in a response to a distance between the vehicle and a termination position being less than a predetermined threshold, an emergency stop of the vehicle.

16. The alarm apparatus according to claim 1, wherein the control unit is configured to terminate display of the first alarm, in a response to a distance between the vehicle and a termination position being less than a predetermined threshold, and display a caution statement and prevent a content other than the caution statement from being displayed on the display for a predetermined time.

* * * * *